US00RE40330E

(19) United States
(12) Reissued Patent
Ueno et al.

(10) Patent Number: US RE40,330 E
(45) Date of Reissued Patent: May 20, 2008

(54) OPTICAL RECORDING MEDIUM, REPRODUCING SYSTEM, METHOD OF REPRODUCING OPTICAL DISK, METHOD OF FABRICATING OPTICAL DISK ORIGINAL RECORD, AND METHOD OF STOPPING ILLEGAL PROGRAM OPERATION

(75) Inventors: Fumiaki Ueno, Hirata (JP); Mitsuaki Oshima, Kyoto (JP)

(73) Assignee: Matsushita Electric Industrial Co., Ltd., Osaka (JP)

(21) Appl. No.: 09/664,434

(22) PCT Filed: Dec. 28, 1994

(86) PCT No.: PCT/JP94/02304

§ 371 (c)(1),
(2), (4) Date: Aug. 28, 1995

(87) PCT Pub. No.: WO95/18443

PCT Pub. Date: Jul. 6, 1995

Related U.S. Patent Documents

Reissue of:
(64) Patent No.: 5,807,640
Issued: Sep. 15, 1998
Appl. No.: 08/507,495
Filed: Aug. 28, 1995

(51) Int. Cl.
*B32B 3/02* (2006.01)

(52) U.S. Cl. ..... 428/64.1; 428/64.2; 428/64.4; 428/913; 369/275.1; 369/284

(58) Field of Classification Search ..... 428/64.1, 428/64.2, 64.4, 913; 369/54, 124, 275.1, 369/275.2, 284, 116
See application file for complete search history.

(56) References Cited

U.S. PATENT DOCUMENTS

| | | | |
|---|---|---|---|
| 4,961,182 | A | 10/1990 | Saito et al. |
| 5,410,527 | A | 4/1995 | Ashinuma |
| 5,475,664 | A | 12/1995 | Shimizume et al. |
| 5,590,111 | A | 12/1996 | Kirino et al. |

FOREIGN PATENT DOCUMENTS

| | | |
|---|---|---|
| JP | 56-47907 | 4/1981 |
| JP | 60-55526 | 3/1985 |
| JP | 63-168876 | 7/1988 |
| JP | 1-18514 | 4/1989 |
| JP | 1-133265 | 5/1989 |
| JP | 3-159429 | 7/1991 |
| JP | 4-325943 | 11/1992 |
| JP | 5-46991 | 2/1993 |
| JP | 5-225567 | 9/1993 |
| JP | 5-289612 | 11/1993 |
| JP | 6-150317 | 5/1994 |

*Primary Examiner*—Elizabeth Mulvaney
(74) *Attorney, Agent, or Firm*—McDermott Will & Emery LLP

(57) ABSTRACT

The present invention provides an optical disk 9 with a duplication preventing function, reproducing system 47 for the optical disk 9, optical disk reproducing method, method of fabricating an optical disk original record, and illegal program operation stopping method. An area in which a CP signal 24 is recorded is made after a signal having a constant pattern in the optical disk, the CP signal 24 being produced such that the center of an eye pattern is shifted from the center of the amplitude. In the reproducing system, CP signal arrangement information 25 or a CP preceding signal 26 is detected, before an offset voltage is applied to a threshold value to be used in demodulating an RF signal into a digital signal so that the threshold value varies, thus normally reproducing the signal in which center of the eye patter is shifted from the center of the amplitude. The reproducing system has a function whereby the reproduction is stopped when a predetermined offset signal is not reproduced.

29 Claims, 26 Drawing Sheets

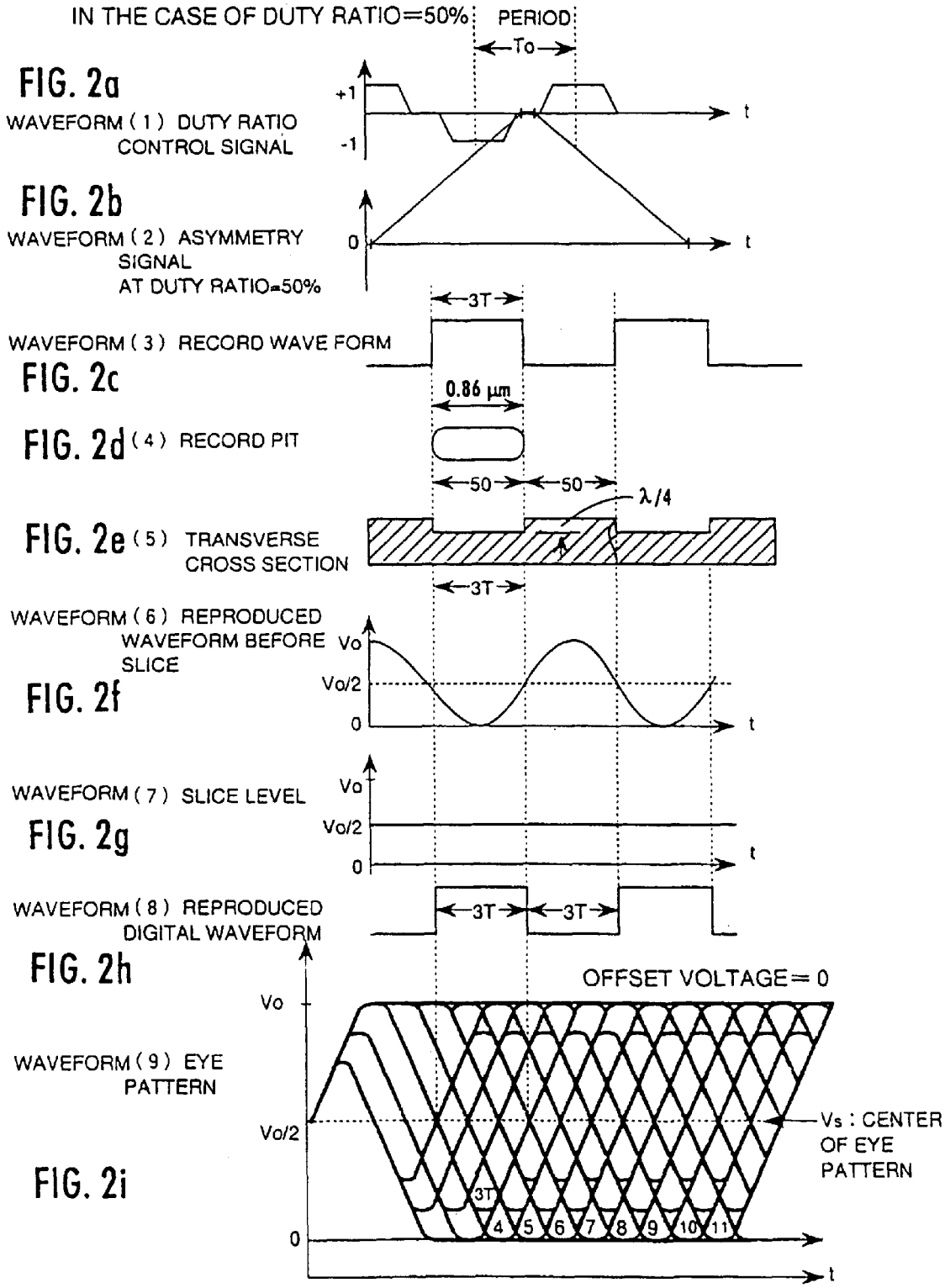
IN THE CASE OF DUTY RATIO=50%
PERIOD
To
FIG. 2a
WAVEFORM (1) DUTY RATIO CONTROL SIGNAL
+1
-1
t
FIG. 2b
WAVEFORM (2) ASYMMETRY SIGNAL AT DUTY RATIO=50%
0
t
3T
WAVEFORM (3) RECORD WAVE FORM
FIG. 2c
0.86 μm
FIG. 2d (4) RECORD PIT
50
50
λ/4
FIG. 2e (5) TRANSVERSE CROSS SECTION
3T
WAVEFORM (6) REPRODUCED WAVEFORM BEFORE SLICE
Vo
Vo/2
0
t
FIG. 2f
WAVEFORM (7) SLICE LEVEL
Vo
Vo/2
0
t
FIG. 2g
WAVEFORM (8) REPRODUCED DIGITAL WAVEFORM
3T
3T
FIG. 2h
OFFSET VOLTAGE=0
Vo
WAVEFORM (9) EYE PATTERN
Vo/2
Vs : CENTER OF EYE PATTERN
FIG. 2i
3T
4
5
6
7
8
9
10
11
0
t IN THE CASE OF DUTY RATIO<50%
PERIOD
To WAVEFORM (1) DUTY RATIO CONTROL SIGNAL
+1
0
-1
t
WAVEFORM (2) DUTY RATIO

WAVEFORM (3) RECORD WAVEFORM (4) RECORD PIT
25
75
(5) TRANSVERSE CROSS SECTION

WAVEFORM (6) REPRODUCED WAVEFORM BEFORE SLICE
Vo
Vo/2

WAVEFORM (7) SLICE LEVEL (CP SIGNAL)
CP=-1

3T
WAVEFORM (8) REPRODUCED DIGITAL WAVEFORM

WAVEFORM (9) EYE PATTERN
VS : CENTER OF EYE PATTERN
OFFSET VOLTAGE =ΔVs
3
4
5
6
7
8
9
10
11

PROCESS DIAGRAM IN ONE-PIECE ORIGINAL RECORD TWO-DIVISION RECORDING SYSTEM

ADDRESS POSITION OF FRAME IN EACH MEDIUM

OPTICAL RECORDING MEDIUM, REPRODUCING SYSTEM, METHOD OF REPRODUCING OPTICAL DISK, METHOD OF FABRICATING OPTICAL DISK ORIGINAL RECORD, AND METHOD OF STOPPING ILLEGAL PROGRAM OPERATION

Matter enclosed in heavy brackets [ ] appears in the original patent but forms no part of this reissue specification; matter printed in italics indicates the additions made by reissue.

DETAILED DESCRIPTION OF THE INVENTION

1. Industrial Application Field of the Invention

The present invention relates to prevention of duplication of a recording medium, and more particularly to an optical disk with a duplication preventing function, a method of fabricating such an optical disk, a method of reproducing an optical disk, a reproducing system, a method of fabricating an optical disk original record, and a method stopping an illegal program operation.

2. Description of the Prior Art

Generally, fabrication of Optical disks succeeds manufacturing of the original record, master, mother and stamper, and optical disks are duplicated and mass-produced from the stamper in accordance with the injection molding technique. The stamper can sometimes be manufactured directly from the original record. Generally, a photoresist is applied onto a glass-made surface-grinded substrate and photosensitized with a laser beam intensity-modulated in accordance with an information signal being recorded before being developed so as to form an irregular configuration comprising signals and/or grooves corresponding to the photosensitivities. These signals and grooves will hereinafter be referred generally to as signals pits.

FIG. 6 is a block diagram showing a conventional recording system for an original record, where a laser optical system for focusing control and a beam expander in a recording laser optical system are omitted from the illustration. In FIG. 6, the whole of the original recording recording system is designated at 61A where numeral 1 represents a recording laser, 2 denotes an optical modulator, 3 depicts a mirror, 4 indicates a lens actuator, 5 stands for a glass plate onto which a photoresist is applied, 6 represents a spindle motor, 7 denotes a signal source, and 8 depicts a recording equalizer. A signal generated from the signal source 7 is subjected to change of its pulse duration (width) by a constant quantity in the recording equalizer 8, before being inputted into the optical modulator 2 to be used to intensity-modulate the laser light emitted from the recording laser 1. The intensity-modulated laser light passes through the mirror 3 and further through a lens, focusing-controlled by the lens actuator 4, before exposing the photoresist on the glass plate 5.

On the other hand, an optical disk reproducing system focuses a semiconductor laser beam on a signal surface of an optical disk and then converts the intensity of the reflected light from the signal surface into an electrical signal (which is called an RF signal) by means of a photodiode or the like of an optical pickup device, which signal is waveform-shaped to be demodulated to a digital signal which in turn, is subjected to a digital signal processing, thus reproducing the original signal.

FIG. 7 is a block diagram showing a prior optical disk reproducing system 47A. In FIG. 7, numeral 9 represents an optical disk, 10 designates an optical pickup, 11 denotes a spindle motor, 12A indicates an analog waveform shaping section, 13 stands for a digital demodulating section, 14 represents a digital signal processing section, 15 designates a control section, 16 denotes a focus servo section, 17 depicts a tracking servo section, and 18 indicates a rotational servo section. Further, numeral 20A stands for a control section for controlling the entire reproducing operation and for issuing a display signal to a display section 41.

A signal immediately before demodulation of the digital signal, i.e., an RF signal, has eye patterns, one example of which is illustrated in FIG. 2. The difference (which is called asymmetry) may occur more or less between the center of the eye pattern and the center of the amplitude thereof, while, even if the difference therebetween takes place to some extent, the slice level Vs is corrected by an automatic correcting slice circuit 31 at the time of the demodulation to a digital signal so that the central voltage Vs of the eye pattern is automatically detected as indicated in the waveform (9) of FIG. 3 before slicing it. A description will be made hereinafter in terms of the center of the eye pattern.

Generally, for reduction of the asymmetry at reproduction, the correction of the duty ratio of a signal to be recorded on an original record is made in manufacturing the original record. This is referred to as the recording equalizing. The optimal recording equalizing quantity depends upon the recording power, developing conditions at pit transfer, reproducing conditions and others.

In some of conventional optical disks, a duplication preventing flag is recorded as a logical duplication inhibiting signal. Accordingly, in the case of the optical disk containing the duplication preventing flag signal, the duplication preventing flag signal is detected in recording of its reproduced signal, thereby preventing the reproduced signal from being recorded by a recording system. However, a reproducing system for ROM disks such as CDs has no function to inhibit the prevention of reproduction from an illegally duplicated medium. Optical disk media writable once and readable by an ordinary reproducing system have heretofore been put on the market. However, if such an optical disk is pick up on the market and the duplication or copy is made thereto from a legal optical disk commercially available, this becomes comparatively high-priced than purchasing the legal optical disk, while a writing system for the duplication has not been in widespread use because of being expensive. For these reasons, there has been no need for the countermeasures against the illegal duplication.

However, recently softwares such as games have been recorded on the optical disk, and the commercially available optical disk containing such game softwares becomes more costly as compared with a general music CD due to the value added by the software. In addition, the price of the optical disk media writable once and reproducible by an ordinary reproducing system is lowering every year. Moreover, the original record fabricating apparatus tends to be easily available. In such a situation, the duplication of an optical disk whose selling price is high in some degree is subject to become lower-priced, besides there have been increasing chances for the original record to be illegally duplicated to sell pirate disks. Thus, a duplication preventing technique has strongly been desired in the situation.

Problems to be Resolved by the Invention

It is therefore an object of this invention to provide an optical recording medium with a duplication preventing function, a reproducing system for an optical disk, a reproducing method of an optical disk, a manufacturing method of an optical disk original record, and a method of stopping the operation of an illegal program.

SUMMARY OF THE INVENTION

Countermeasures for Resolution of the Problems

According to this invention, for achieving the foregoing object, provided in an optical disk is an area in which a signal having the center of an eye pattern deviated from the center of the amplitude of the eye pattern is recorded after a signal with a given pattern, and further added to a reproducing system are a function to change the threshold value in demodulating an RF signal into a digital signal after detection of a signal with a constant pattern and a function to stop the reproducing operation except for the reproduction of a signal whose eye pattern has a center deviated from the center of its amplitude. A description about the eye pattern center and the amplitude center will be made hereinafter.

Operation

A digital signal reproduced from an area containing a recorded signal, the center of an eye pattern of which is deviated from the center of the amplitude, by a reproducing system and demodulated into a digital signal is a normal signal, and if the demodulated signal is recorded on a recordable optical disk medium, when the recorded signal is reproduced, there results in the center of the eye pattern being substantially coincident with the center of the amplitude. Accordingly, if the reproducing system changes the threshold value and makes a reproduction in demodulating the RF signal into the digital signal, the signal is not reproduced as a normal signal so as to stop the reproducing operation. This makes the reproduction of the disk difficult and prevents the illegal duplication.

BRIEF DESCRIPTION OF THE DRAWINGS

FIGS. 2a–2i are illustrations of one example of common eye patterns with no offset in an optical disk;

DESCRIPTION OF THE PREFERRED EMBODIMENT

First Embodiment

Figures 8A, 8B, 8C, 8D:
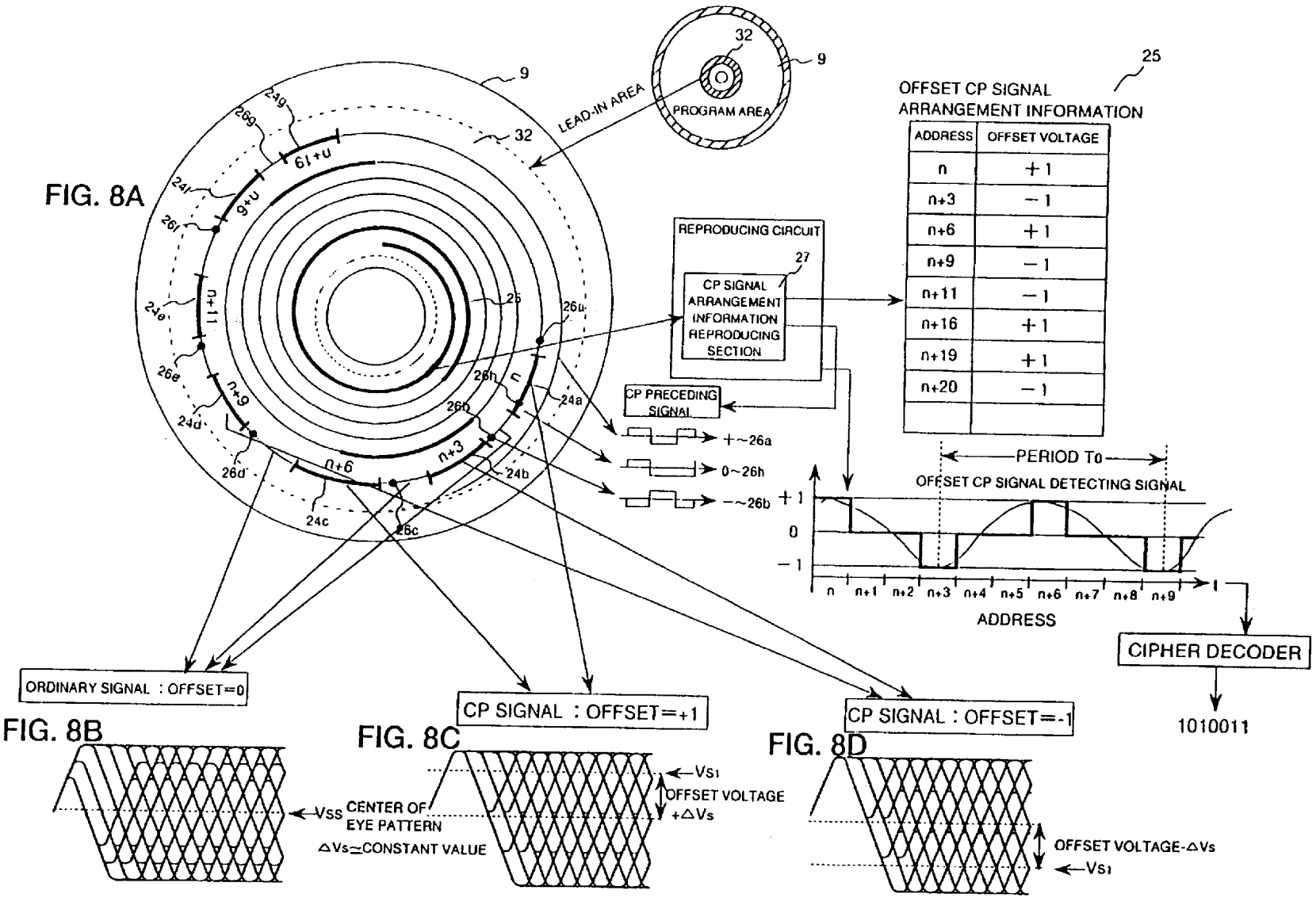
FIGS. 8A to 8D are illustrations for explanation of a recorded signal on an optical disk being an optical recording medium according to the first embodiment of this invention.

A description will be made hereinbelow in terms of an optical recording medium and an optical disk reproducing system according to a first embodiment of the present invention. According to this invention, a special copy protection signal different from the ordinal signal is mixed into a recording signal in manufacturing an original record for optical ROM disk such as CDs being optical recording media, thereby fabricating a special original record which can prevent the duplication. This special copy protection signal is expressed as a CP signal. As shown in FIG. 8A, in an optical disk which is an optical recording medium according to the first embodiment of this invention, there is given an area for recording CP signals 24 (24a to 24g) after an offset CP signal arrangement information signal 25 (which is also referred to as CP signal arrangement information) with a specific pattern, the CP signals being made such that the duty ratio is shifted from the standard value (generally 50%) so that the center of the eye pattern is shifted from the center of the amplitude by a given quantity. The center of the eye pattern means a portion corresponding to the optimal slice level (threshold value) in an analog waveform block when being reproduced in a reproducing system. On the other hand, the center of the amplitude means the center of the eye pattern in the amplitude direction which is measured geometrically.

In addition, it is also possible that CP signal preceding signals 26 (26a to 26g) with a specific pattern are further placed slightly prior to the respective CP signals 24a to 24g. These specific pattern CP signal proceeding signals 26 (26a to 26g) are clearly indicative of the fact that the recording area of the CP signals the center of the eye pattern of which is shifted by a given offset amount from the center of the amplitude is present afterwards in order of time in the reproduction. When they are provided together with the CP signal arrangement information 25, only one of the both is possible to use. Although the second embodiment (FIG. 20, FIG. 21A and FIG. 21B) will be described hereinafter which checks the presence or absence of the CP signal using only the CP signal arrangement information 25, the modes using only the CP signal arrangement information 25 in the first and second embodiments are different from each other.

Figure 1:
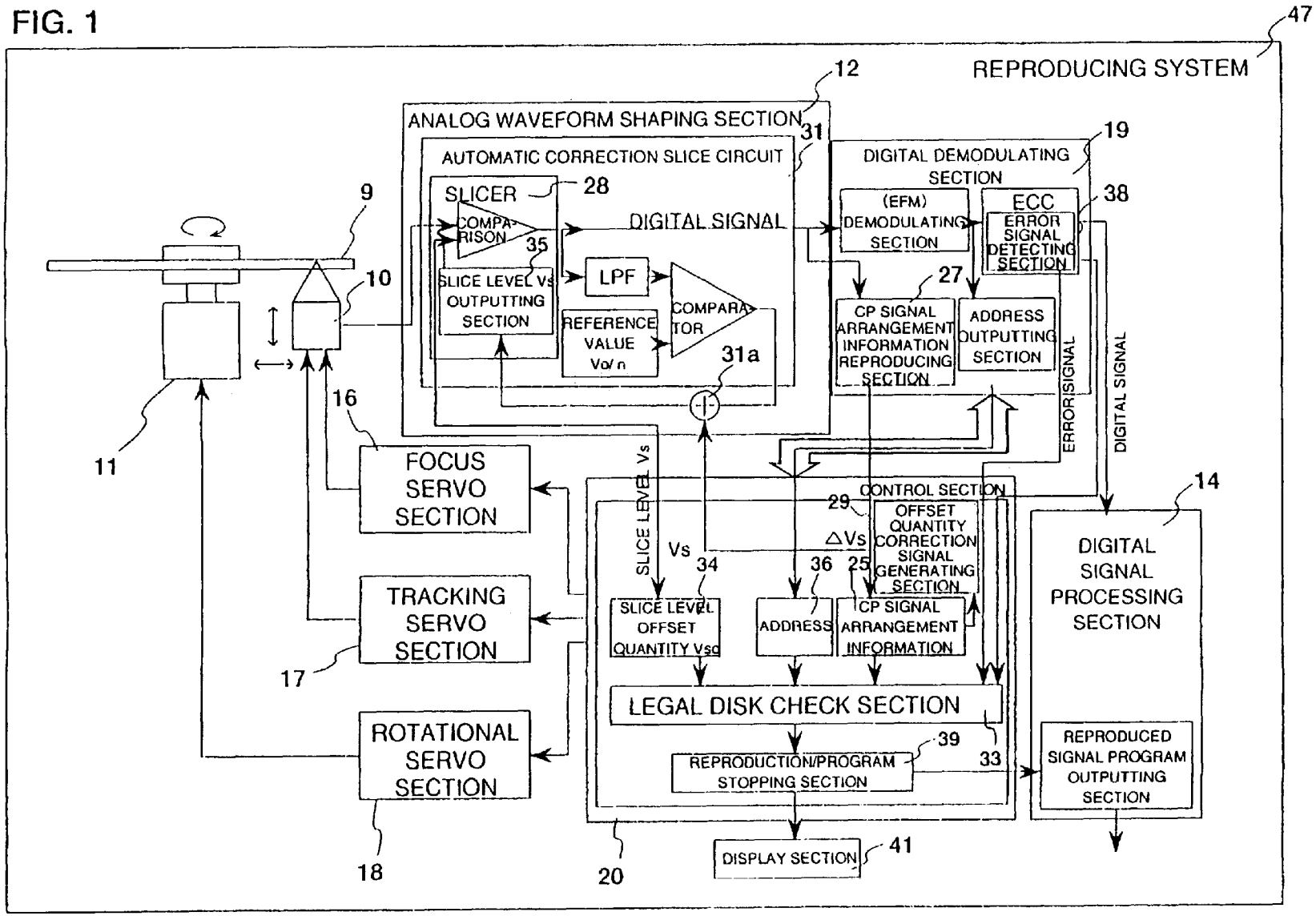
FIG. 1 is a block diagram showing an arrangement of an optical disk reproducing system according to a first embodiment of the present invention.

FIG. 1 is a block diagram showing an optical disk reproducing system according to the first embodiment of this invention. In FIG. 1, included therein is means whereby one or both of he CP signal preceding signals 26a to 26g and CP signal arrangement information 25 having a specific pattern as shown in FIG. 8A are detected in a CP signal arrangement information reproducing section 27 before the threshold value Vs of a level slicer 28 taken in demodulating the RF signal into a digital signal is changed by an offset amount VsR corresponding to the foregoing given amount, and further included is stopping means whereby, when the signal with the offset amount VsR in which the center of the eye pattern is shifted from the center of the amplitude by the given amount is not correctly reproducible, a decision is made such that it is a duplicated disk and the reproduction stops, or when the data read out is a computer program, the operation of the program stops.

In the FIG. 1 block diagram, reference numeral 47 represents the whole of the reproducing system, numeral 9 designates an optical disk, numeral 10 indicates an optical pickup, numeral 11 denotes a spindle motor, numeral 12 depicts an analog waveform shaping section, numeral 14 indicates a digital signal processing section, numeral 16 stands for a focus servo section, numeral 17 is indicative of a tracking servo section, numeral 18 is representative of a rotational servo section, numeral 19 represents a digital demodulating section where the threshold value to be taken in demodulating the RF signal into the digital signal is changeable, and numeral 20 designates a control section for controlling such that the aforesaid threshold is changed beforehand by the offset amount VsR when the CP signal arrangement information 25 having a specific pattern or the CP signal preceding signals 26a to 26g are detected at reproduction.

The optical disk 9 is rotatable with the spindle motor 11, and the optical pickup 10 focuses a laser beam from a semiconductor laser on a signal recorded surface of the optical disk 9 and receives the reflected light from the signal surface to convert the intensity of the reflected light into an electrical signal through a photodiode or the like, thus obtaining an RF signal. The optical pick up 10 is controlled by the focus servo section 16 at all the time so as to focus the light on the signal surface of the optical disk 9, as well as being controlled by the tracking servo section 17 so that the focus of the semiconductor laser light follows a signal track.

Figures 3A, 3B, 3C, 3D, 3E, 3F, 3G, 3H, 3I:
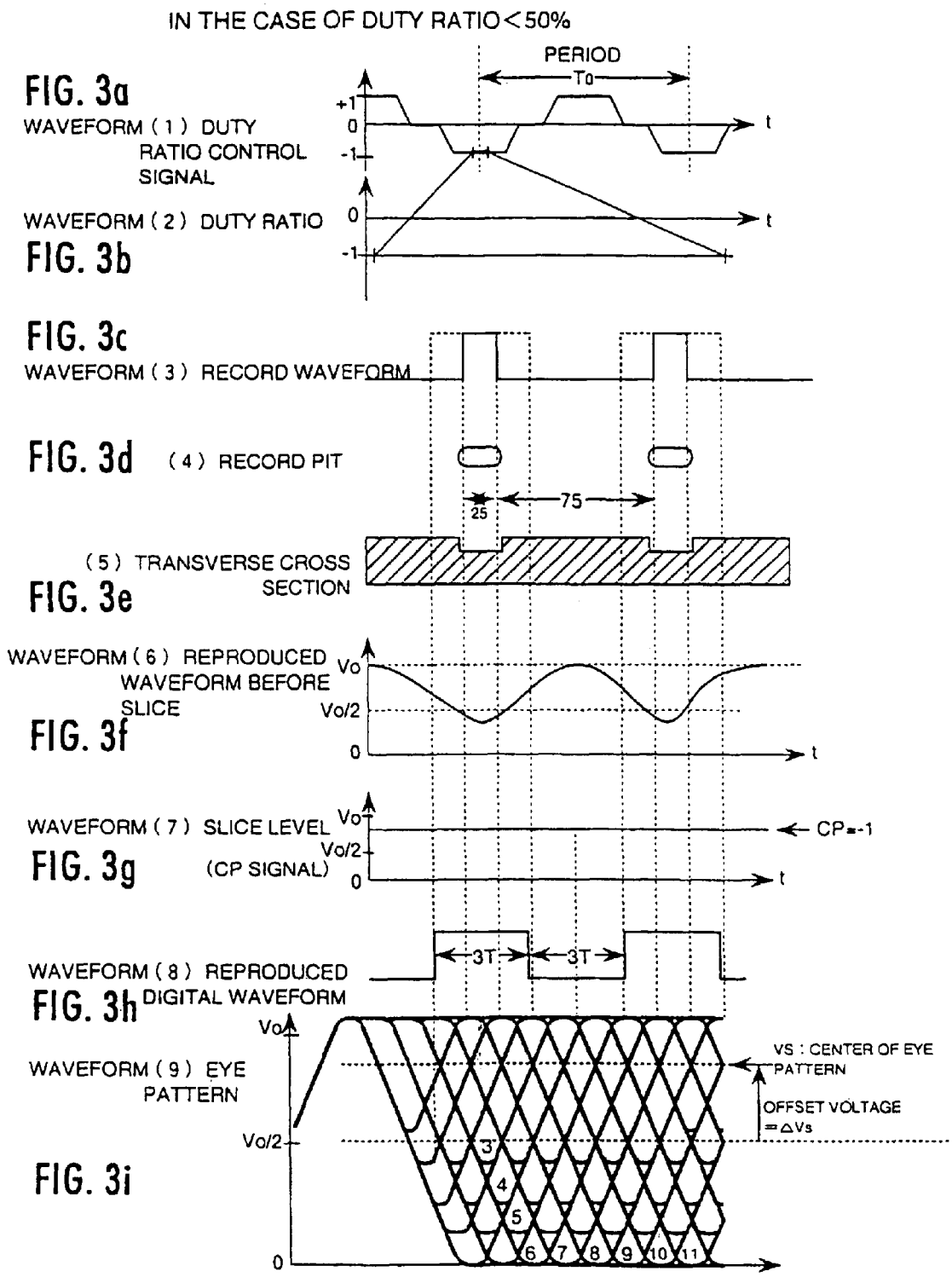
FIGS. 3a–3i are illustrations of one example of eye patterns with a given offset in an optical disk.

The RF signal is shaped in the analog waveform shaping section 12 to turn to a rectangular configuration before being demodulated into a digital signal in the digital demodulating section 19, the digital signal being digitally processed in the digital signal processing section 14, with the result that the original signal is obtainable. Indicated in a waveform (9) of FIG. 2 is one example of an eye pattern in an area where the center of the eye pattern comes close to the center of the amplitude and the ordinary recording is made without the generation of the offset voltage. In the illustration, the vertical axis indicates the reflected light quantity and the upper side is representative of larger light quantities. Further, indicated by a waveform (9) of FIG. 3 is one example of an eye pattern in an area where a signal is recorded such that the center of the eye pattern is shifted from the center of the amplitude by a sufficiently large and proper offset voltage.

Figure 9A:
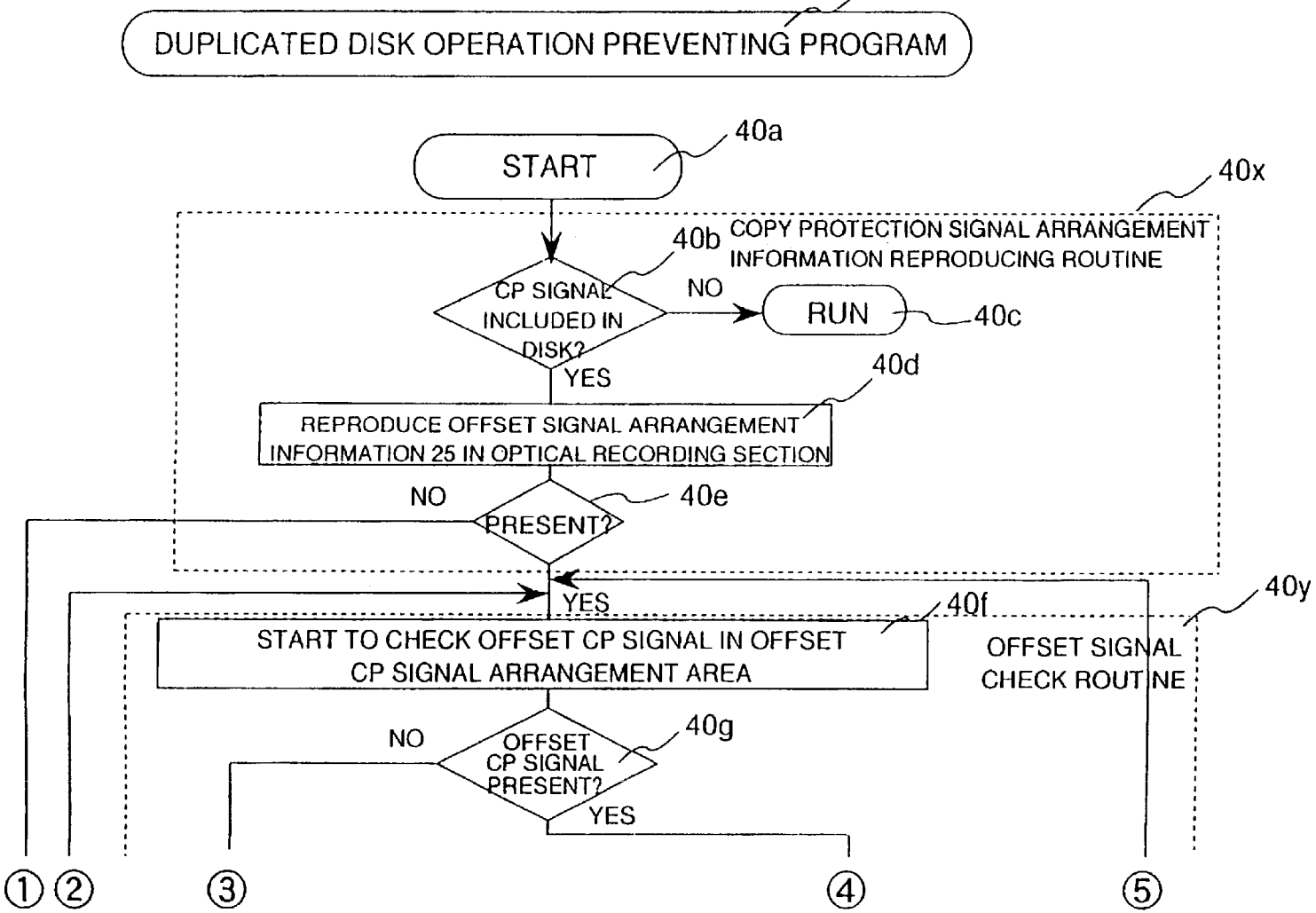
FIGS. 9A and 9B illustrate the first half and the latter half of a flow chart of a duplicated disk operation preventing program in the first embodiment.
Figure 9B:
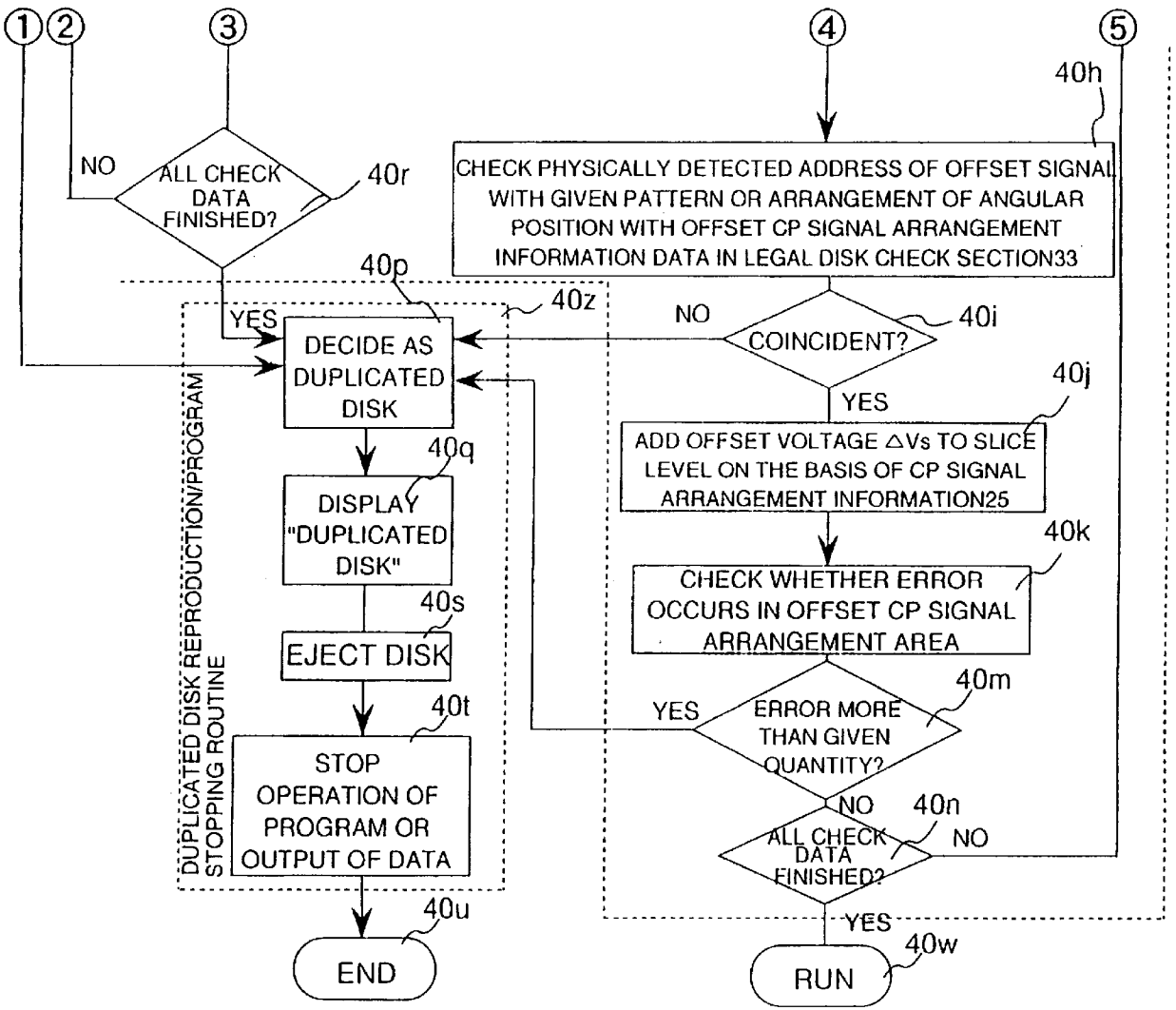

The control section 20, in addition to controlling the operation of the entire reproducing system, gives an instruction using the reproduced signal to change, for a short time, the threshold value, i.e., the slice value Vs, to be used for the demodulation of the digital demodulating section 19 in correspondence with the eye pattern center offset voltage in the recorded signal. The control section 20 can be arranged as shown in FIG. 1, while it is also appropriate that, using a CPU (central processing unit), it is arranged with a program which operates in accordance with the operational flow as shown in FIGS. 9A and 9B. Further, a general-use personal computer can be used as the control section 20.

In the optical disk 9 according to this invention, there is provided and area (first recording area) recording a signal to the effect that the center of the eye pattern is shifted by a desired quantity from the center of the amplitude. Further, in this optical disk 9, the CP signal arrangement information 25 being an arrangement table indicative of the arrangement state of the offset CP signals 24 and the CP signal preceding signals 26 having a specific pattern are recorded in an ordinarily recorded area where the center of the eye pattern is close to the center of the amplitude varying in a constant range. The area in which these signals 25 or 26 are recorded is referred to as a second recording area. When the CP signal arrangement information with a specific pattern or the CP signal preceding signals 26 are reproduced, the the optical disk reproducing system according to this invention makes a decision that the offset CP signal 24 whose center of eye pattern is intentionally shifted in some degree is recorded behind the specific pattern. For correctly reproducing this CP signal 24, the analog waveform shaping section 12, which demodulates into a digital signal the RF signal outputted from the optical pickup 10 in FIG. 1, is arranged as follows. The analog waveform shaping section 12 is equipped with an automatic correction slice circuit 31 and an adder 31a placed in its feedback path. The offset correction voltage is applied through the adder 31a thereto, and the slice level instantaneously is changed in accordance with the variation of the center of the eye pattern. This operation can cope with the variation of the offset voltage faster than the response speed of a level slicer 28 of the automatic correction slice circuit 31.

Thus, the reproduction is made to the area in which a signal the center of the eye pattern is shifted from the center of the amplitude is recorded subsequently to signal with the specific pattern. For the reproduction of this area, the threshold value VsR of the slicer 28 in demodulating the RF signal of the reproducing system into a digital signal is in advance changed by an offset voltage ΔVs taking the CP signal arrangement information 25 or the CP preceding signal 26 into consideration. Accordingly, it is possible to properly reproduce the area (first recording area) containing the signal the center of the eye pattern is shifted from the center of the amplitude.

In order to more stably reproduce the area with no offset, it is preferable that a preceding signal having a specific pattern is also recorded in the area (first recording area) in which the offset signal is recorded, i.e., in the CP signal 24 recording area. This specific pattern preceding signal is a signal 26h indicated by a point and close to the end of the CP signal 24a recording area in FIG. 8A. Similar signals are recorded in portions close to the ends of the recording areas of the other CP signals (24b, 24c, . . . ). These portions are omitted from the illustration. In contrast to the CP preceding signals 26a, 26b, . . . announcing the variation of the offset level beforehand preceding each CP signal 24, this preceding signal 26h is for again announcing the variation of the offset level (returning to the original) prior to the ordinary signal subsequent to the CP signal. In other words, this preceding signal 26h is representative of the fact that the first recording area in which the CP signal is recorded approaches its end and is for making a preparation for returning to the original level. That is, when the preceding signal 26h is reproduced, the optical disk reproducing system according to this invention instantaneously and sharply changes the slice level in demodulating the RF signal to the digital signal to return it to the original. Thus, the reproduction is made to the area in which the signal is ordinarily recorded so that the center of the eye pattern is close to the center of the amplitude, subsequently to the specific pattern signal, while the threshold value is demodulating the RF signal of the reproducing system 47 into the digital signal is returned to the ordinary level, thereby making possible proper reproduction.

Even if any signal is used as the specific pattern signal to change the threshold value in demodulating the RF signal into the digital signal, it provides no problem. The CP signal arrangement information 25 shown in FIG. 8A or the specific pattern signal gives an instruction as to whether the threshold value is shifted to, for example, +1 so that the center of the eye pattern comes to the mirror side (the high reflectance side) of the amplitude in the area from a specific address An to another specific address An+1 as shown in FIG. 8C or the offset amount of the threshold value is shifted to, for example, −1 so that the center of the eye pattern comes to the side (the low reflectance side) opposite to the mirror side of the amplitude as shown in FIG. 8D. It is also appropriate that the shifting direction is fixed to one direction so that only the shifting is indicated by 1 or 0.

A description will be made hereinbelow in terms of how to prevent the duplication in the optical disk according to this invention which contains the signal area (first recording area) where the center of the eye pattern is shifted from the center of the amplitude. In cases where the reproduced information from the optical disk according to this invention is duplicated or copied onto an optical disk medium writable once and reproducible by an ordinary reproducing system, the information of the optical disk according to this invention is reproduced by the ordinary reproducing system and demodulated into a digital signal, the writing light being modulated on the basis of the demodulated digital signal and the data corresponding to the modulated light being written in the optical disk medium.

For the signal recorded area where the center of the eye pattern is shifted from the center of the amplitude, the reproducing system is provided with the automatic correction slice circuit (auto level slicer) 31 whereby the slice level can automatically be corrected even if the duty ratio varies. Accordingly, since the automatic correction slice circuit 31 automatically changes the threshold value taken in demodulating into the digital signal, the ordinary and correct signal is reproducible. For this reason, in the optical disk duplicated, even in the area where the signal was recorded such that the center of the eye pattern is shifted from the center of the amplitude, there is written an ordinary signal the center of the eye pattern of which is substantially coincident with the center of the amplitude.

Since in the legal optical disk the auto level slicer does not change the threshold value VsR to be taken in demodulating the RF signal into the digital signal, for the recorded area of the signal with an offset value, for example, Vs+ΔVs whereby the center of the eye pattern is shifted from the center of the amplitude, when the reproducing system reproduces the above-mentioned duplicated optical disk, the signal the center of the eye pattern of which is substantially coincident with the center of the amplitude does not have the offset, the duplicated optical disk is not decided as a legal disk. Since the reproducing system is equipped with means to stop the reproduction operation if the area of the recorded signal the center of the eye pattern is shifted from the center of the amplitude does not exist in the normal area and the correct reproduction does not take place, automatically stopping the reproduction or the operation of the program is possible, thus not allowing the reproduction or operation of the program in the duplicated optical disk and preventing the illegally duplicated optical disk from being in use.

In general, in optical disks a signal is recorded spirally from the innermost circumferential portion to the outer circumferential portion. In the case of compact disks (CD) or the like, a lead-in area is placed at the innermost circumferential portion to record retrieval information and others. It is desirable that, even in the optical disk according to this invention, the area where the CP signal the center of the eye pattern of which is shifted from the center of the amplitude is recorded is located at an innermost circumferential portion corresponding to a CD lead-in area as shown in FIG. 8A, which permits a decision to be quickly made at the beginning of reproduction as to whether it is a duplicated optical disk or not.

A more detailed description will be made in terms of the duplication preventing program which comprises three routines: a copy protection arrangement information reproducing routine 40x, an offset signal check routine 40y and a duplicated disk reproduction/program stopping routine 40z. In the flow chart of FIGS. 9A and 9B, a step 40a is first executed to start to reproduce the CD information, for example, a computer program. The description will be made hereinbelow about the case that the computer program is reproduced as the CD information. A step 40b is then implemented to check from a TOC (Table of Contents) flag or the like whether it is a CP signal corresponding disk or not. If the answer is "YES", the operational flow goes to a step 40d to obtain the CP signal arrangement information 25 from the reproduced signal as shown in FIG. 8A. A step 40e is for detecting the presence or absence of the CP signal arrangement information 25, and when not detected, the operation comes to an end, and on the other hand, in response to only the detection of the CP signal arrangement information 25, the operational flow advances to a step 40f to start to check the offset CP signal 24 in the area where the offset CP signal is placed. Subsequently, a step 40g is implemented to check the presence of the CP signal 24, for example, whether the offset slice level exists or not. If the offset slice level does not exist in this area, the operational flow proceeds to a step 40r. If all the check data do not finish, the operational flow returns to the step 40f, while if all the check data end, the operational flow goes to a step 40p where a decision is made such that it is a duplicated disk. On the other hand, if the answer of the step 40g is "YES", the operational flow advances to a step 40h in order to check in a legal disk check section 33 whether or not the data of the offset CP signal arrangement information 25 are coincident with the amplitude, period To, address and angular position of the offset CP signal detected physically. If a step 40i shows that the check result is OK, the operational flow proceeds to a step 40j to compulsorily add the offset voltage ΔVs to the slice level on the basis of the CP signal arrangement information 25. Thereafter, a step 40k is implemented to check whether or not an error or incorrect signal occurs in the CP signal arrangement region. When a step 40m indicates that an error exceeding a constant degree develops, the step 40p follows to decide that it is a duplicated disk. On the other hand, if the step 40m does not indicate the generation of such an error, the operation flow goes to a step 40n. If the all the check data come to an end, in a step 40w the computer program read out gets into operation. On the other hand, if not coming to an end, the operational flow returns to the step 40f.

Now, when the step 40p made a decision as a duplicated disk, a step 40q is executed in order to display "duplicated disk" on a display section 41, then followed by a step 40s to eject the disk and further followed by a step 40t to stop the operation of the program as well as to stop the output of the data, and still further followed by a step 40u to terminate the entire operation.

A description will be made in terms of the principle of the generation of the step 40k error. In cases where the offset voltage sharply varies for a short time like the CP signals 24a and 24b in FIG. 8A, the follow-up of the response speed of the feedback control in the automatic correction slice circuit 31 becomes difficult, with the result that an error occurs in the ordinary circuit. However, in the case of the first embodiment of this invention, the offset voltage of the CP signal varies due to the CP preceding signal 26a, 26b, 26c, . . . or the CP signal arrangement information 25 shown in FIG. 8A, while this can be known beforehand. On the basis of the preceding signal, an offset amount correction signal generating section 29 in FIG. 1 adds the offset correction signal ΔVs to a feedback bus of a slice level Vs outputting section 30 of the automatic correction slice circuit 31. Accordingly, with the offset correction signal ΔVs being added at the variation point at which the CP signal 24 starts, the slice level Vs instantaneously varies to the value to which the offset ΔVs is added, and the CP signal 24 is normally reproducible without generation of errors. In the legally manufactured disk 9, specific duty ratios, for example, 50:50, 30:70, 70:30, are added to the disk pits, whereby as illustrated in FIGS. 8A, 8B and 8C the offset voltage is added to the slice voltage at reproduction to develop three normal slice voltages Vs, Vs+ΔVs and Vs−ΔVs.

Therefore, in the FIG. 1 first embodiment, the normal offset voltage is added to the slice voltage on the basis of the offset CP signal arrangement information 25 or the CP preceding signal 26, which makes it reproducible without occurrence of errors. In FIG. 1, blocks 25, 34 and 36 merely indicate the kinds of data but not denoting circuits or the like. The legal disk check section 33 checks whether or not an error signal from an error signal detection section 38 develops at the position of the signal to which a given offset voltage ΔVs is added by an offset amount correction signal generating section 29 in a given address 36 of the CP signal arrangement information 25. In addition, the legal disk check section 33 checks whether or not the normal signal code is reproduced from the digital demodulating section 19. If it is a legal disk, the check result is correct, whereupon the reproduction continues. On the other hand, if the check result is incorrect, the reproduction/program stopping section 39 issues a stopping signal to stop the output of the reproduced signal or the operation of the program. In the case of the disk illegally copied from the data reproduced from the legal disk 9, the offset voltage is impossible to duplicate (correctly copy), whereby the given offset voltage does not exist at the given address position set forth in the CP signal arrangement information 25.

Therefore, in the legal disk check section 33 of FIG. 1, the measured offset voltage (physical value) is checked with the offset voltage indicated by the CP arrangement information 25, which makes possible the discrimination from the illegal disk. Moreover, when the ordinary offset voltage is high, in the automatic correction slice circuit 31 the operating frequency followable lowers to the extent of the response frequency fo in the offset correction control. When the variation of the offset voltage is made to take place at a frequency above fo in reproducing a high offset voltage portion and an ordinary area as shown in FIG. 8A, the automatic correction slice level is fixed to the direction in which the offset voltage is higher.

For this reason, the offset area is ordinarily sliced with a slice level higher than the ordinary level. In the case of the legal disk, when the slicing is made with the higher offset voltage, the normal signal is reproducible, whereupon the error does not occur. On the other hand, in the case of a disk illegally duplicated from the data derived from the legal disk, the offset voltage is not duplicable and hence the offset voltage does not develop from the CP signal area and the slicing is made with an ordinary slice level, for which reason the normal signal is not reproducible and the error occurs, whereby the legal disk check section 33 in FIG. 1 decides it as an illegal disk to stop the operation. Furthermore, if three kinds of preceding signals 26a, 26h and 26b (the CP preceding signals 26a, 26b, and preceding signal 26h) of +, 0 and − are provided, the slice level of the data of the next frame synchronizing signal can be known beforehand, and therefore, when the offset voltage ΔVs is added to the feedback signal of the automatic correction slice circuit 31 through the adder 31a placed in the feedback bus in FIG. 1, it is possible to instantaneously change and set the slice level to a correct slice level.

Thus, even if the slice level of the legal disk varies at a frequency higher than the follow-up frequency of the automatic correction slice circuit 31, the slicing is always made with slice levels of +, 0 and −, whereby the correct signal is reproducible without occurrence of errors.

Usually, the duplication traders derive a logical signal such as "101" from a CD-ROM and then records this logical signal on an original record to fabricate the original record, by which original record a duplicated disk is mass-produced. In the case that the duplicated disk is manufactured with this logical signal level, the offset voltage is difficult to copy. Accordingly, the disk original record is duplicated with no offset voltage being changed in the recording area of each of the offset CP signals. On the other hand, the data of the CP preceding signal 26 is directly copied on the illegally duplicated original record. In a case where the duplicated disk is mounted on a reproducing system and the +CP preceding signal 26a is reproduced as shown in FIG. 8A, the slice level of the slicer 28 increases in the + direction as shown in FIG. 8C. Since in the duplicated disk the offset voltage is not recorded, the eye pattern has a configuration with no offset as shown in FIG. 8B, and difficulty is encountered to output the normal signal because the slice level of the slicer 28 is deviated from the center.

However, in the first embodiment of this invention, the slice level is compulsorily set to the + direction on the basis of the CP signal arrangement information 25 or the CP preceding signal 26. Therefore, an incorrect digital signal is outputted from the automatic correction slice circuit 31 of FIG. 1 and an error signal is outputted from the error detecting section 38, whereby the legal disk check section 33 decides that it is a duplicated disk. Concerning the offset CP signal recording area in which a signal having the center of the eye pattern shifted from the center of the amplitude is record, the pulse duration, i.e., the duty ratio, varies with the variation of the recording equalizing amount, thus allow simple manufacturing.

Figure 4:
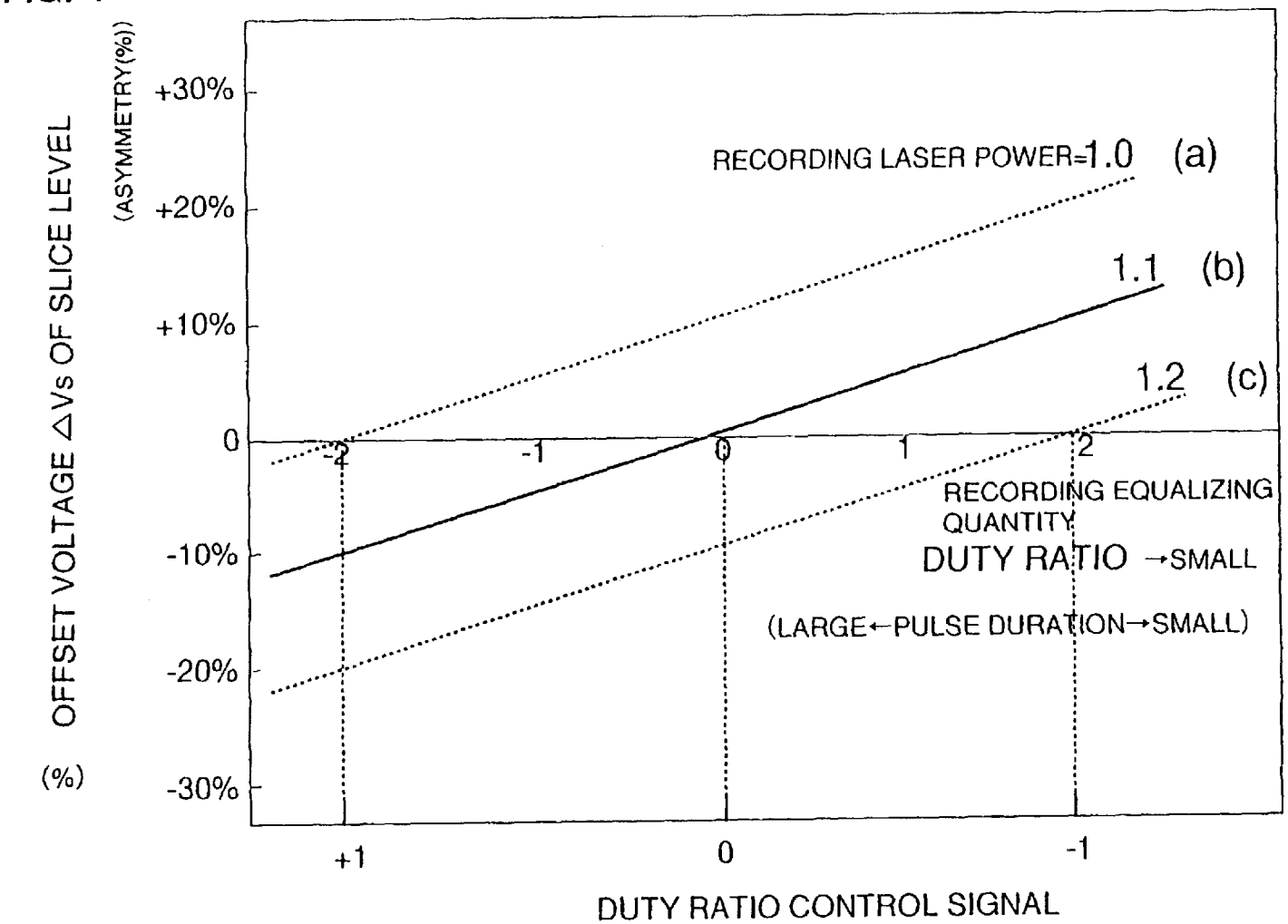
FIG. 4 illustrates the variation of asymmetry due to the recording power and recording equalizing quantity in the first embodiment.

When as shown by a waveform (1) of FIG. 3 a duty ratio control signal is varied with a period To and has a negative level, the recording equalizing amount becomes large as shown in FIG. 4. Thus, a duty ratio is obtained as shown by a waveform (2) in FIG. 3, and the illuminating time of the laser light to be applied to a photoresist on a glass plate becomes short as shown by a recording waveform (3) in FIG. 3 so that the duty ratio becomes small as indicated by (4) and (5) of FIG. 3, that is, signal pits with a depth of $\lambda/4$ are formed which is short in the track direction. When short signal pits as indicated by (5) of FIG. 3 is reproduced, since the lowering of the reflected light quantity is slight, a signal made such that the center of the reflected light quantity is shifted to the positive direction is obtained as shown by (6) of FIG. 3, thus obtaining a signal that the center of the eye pattern is shifted to the mirror side of the amplitude, that is, shifted by the offset voltage $\Delta Vs$ for the high reflectance side as shown by a waveform (9) of FIG. 3.

In this case, the well-known automatic correction slice circuit 31 in FIG. 1 operates, and the slice level is automatically corrected to $Vs+\Delta Vs$ obtained by adding the slice level Vs to $\Delta Vs$, this state being shown by a waveform (7) in FIG. 3. When the period of the reproduction synchronizing signal of the modulation signal is taken as T, as shown by the waveform (9) in FIG. 3, since the slicing is carried out with a 3T signal level, as shown by a waveform (8) in FIG. 3 a correct digital output having a pulse duration of 3T is obtainable. Thus, the $+\Delta Vs$ offset voltage generates in the slicer 28. On the contrary, when the recording equalizing value, i.e., "1001" quantity, is reduced, as shown in FIG. 4 the duty ratio becomes larger and illumination time of the laser light becomes longer so as to form a longer signal pit in the track direction. When a signal pit with a large duty ratio is reproduced, as shown in FIG. 8D the offset voltage existing at the center of the eye pattern is shifted in the negative direction, that is, shift by $-\Delta Vs$ toward the low reflectance side, i.e., the opposite side to the mirror side of the amplitude. The CP signal recording are in which the offset CP signal 24 that the center of the eye pattern is shifted by the offset voltage $\Delta Vs$ from the center of the amplitude is recorded can easily be formed with the power of the recording laser light being varied in a given mode.

When the recording laser light power is made smaller as shown in FIG. 4, even if the recording power is in the ordinary range and the recording equalizing quantity is appropriate, the signal pit becomes smaller. When the small signal pit is reproduced, the whole reflected light quantity becomes larger, which provides a signal that the center of the eye pattern is shifted toward the mirror side of the amplitude, i.e., the high reflectance side, as shown by the waveforms (6) and (9) in FIG. 3. On the other hand, when the recording power is made large, even if the recording power is in the ordinary range and the recording equalizing quantity is proper, as shown in FIG. 4 the signal pit becomes larger. When the large signal pit is reproduced, the reflected light quantity becomes small, thereby obtaining a signal that the center of the eye pattern is shifted by the offset voltage $-\Delta Vs$ toward the side opposite to the mirror side of the amplitude (low reflectance side) as shown in FIG. 8D.

Figure 12:
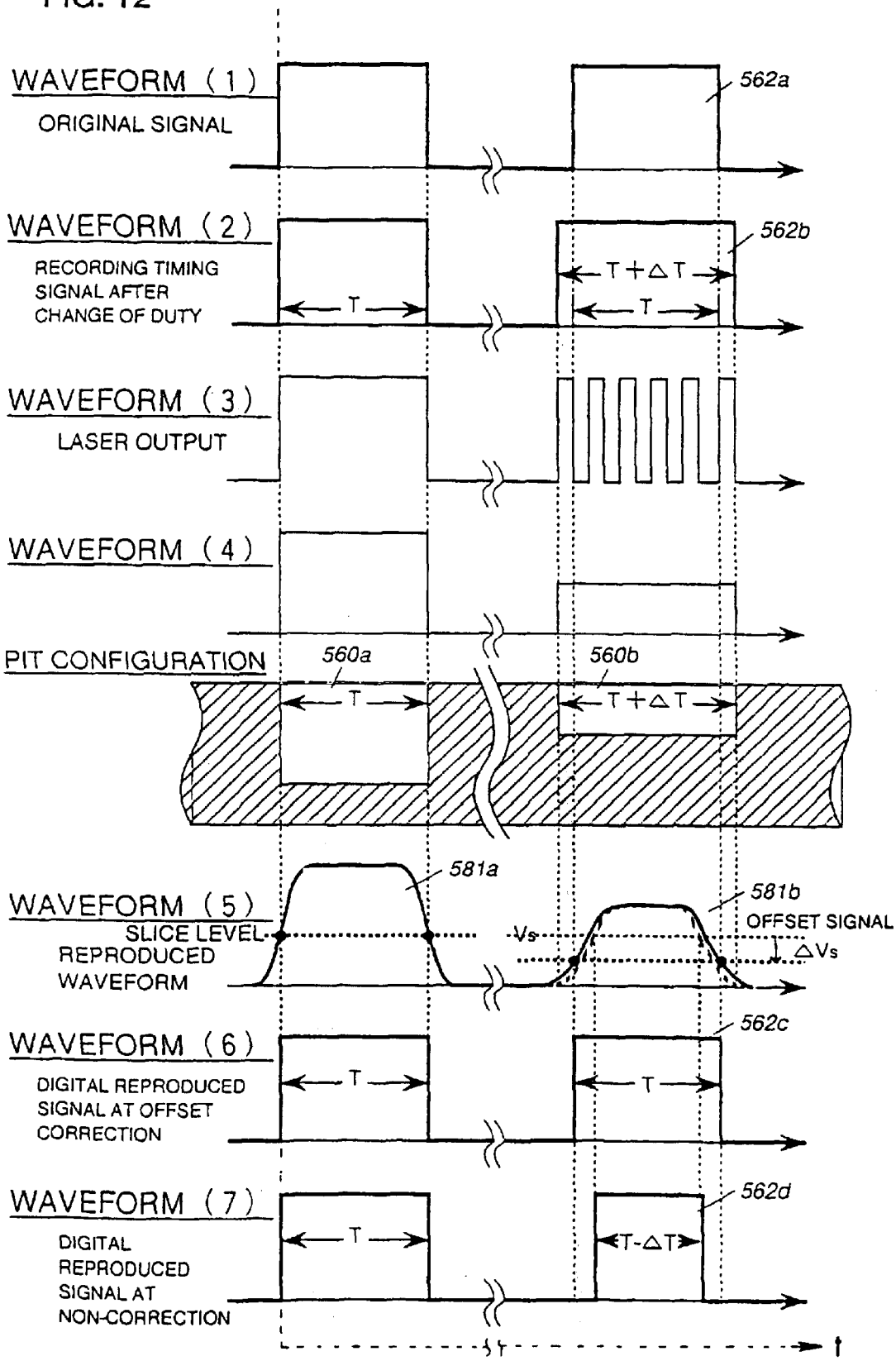
FIG. 12 shows waveforms of offset voltages in the first embodiment which take place when the pulse duration and laser power vary.

FIG. 4 diagrammatically shows the variation of the relationship between the center of the eye pattern and the center of the amplitude due to the recording power and the recording equalizing quantity. In FIG. 4, the transverse axis indicates the recording equalizing quantity. As it becomes larger, the pulse width of the recording signal becomes smaller, that is, the duty ratio becomes smaller. Further, in FIG. 4, the axis of ordinate is representative of the shifting quantity of the center of the eye pattern from the center of the amplitude, that is, is indicative of the offset quantity $\Delta Vs$ normalized with the amplitude and expressed in percentage. When the duty ratio control signal becomes smaller, since the center of the eye pattern is shifted to the high reflectance side, the offset voltage $\Delta Vs$ increases in the positive direction. In the illustration, the recording power becomes larger in the order of (a), (b), (c). When the recording power indicated by (a) assumes 1.0, the recording powers indicated by (b) and (c) show 1.1 and 1.2, respectively. (1) to (7) in FIG. 12 indicate waveforms in a case where the recording power and the duty ratio vary. When the laser light power is changed, the correction of the pulse duration is necessary, thereby deteriorating the yield. If well manufactured, the slice level is corrected by the quantity corresponding to the offset as shown by the waveform (5) in FIG. 12, with the result that a digital signal as shown by (6) in FIG. 12 is outputted. In this case, the duplication is difficult because of the deteriorated yield.

Figure 5:
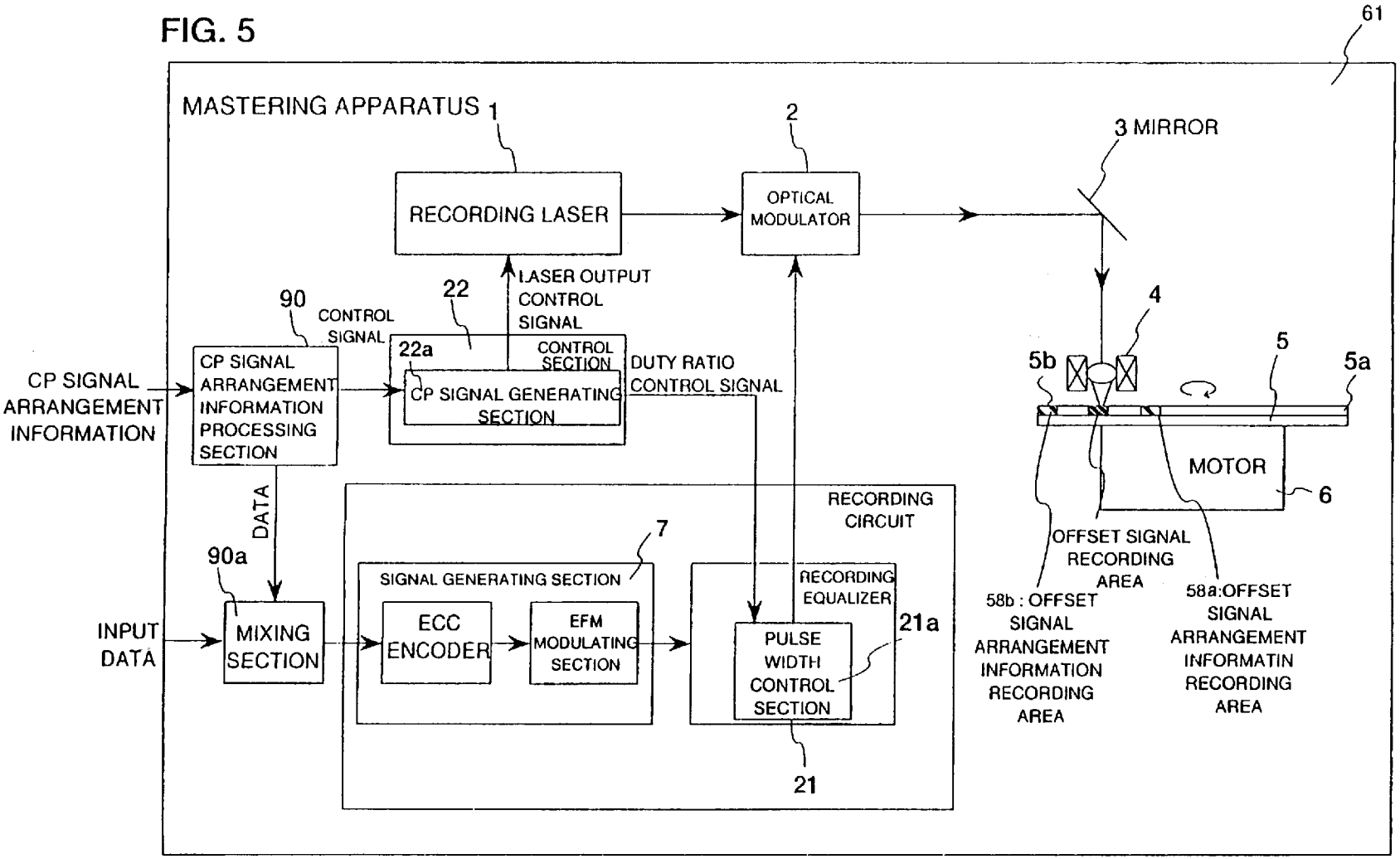
FIG. 5 is a block diagram showing one arrangement of a recording system for an optical disk original record in the first embodiment.
Figure 6:
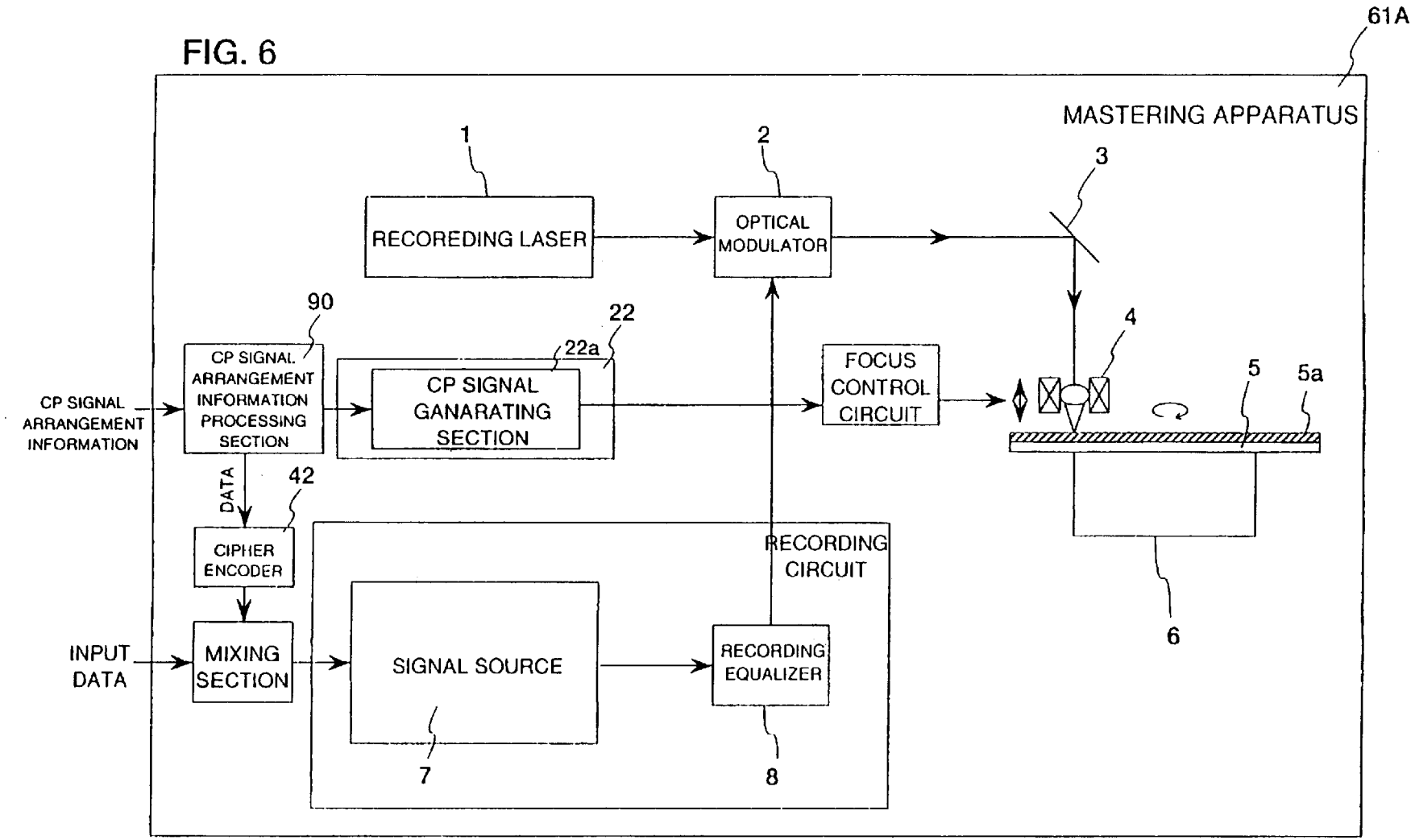
FIG. 6 is a block diagram showing an arrangement of a conventional recording system for an optical disk original record.
Figure 7:
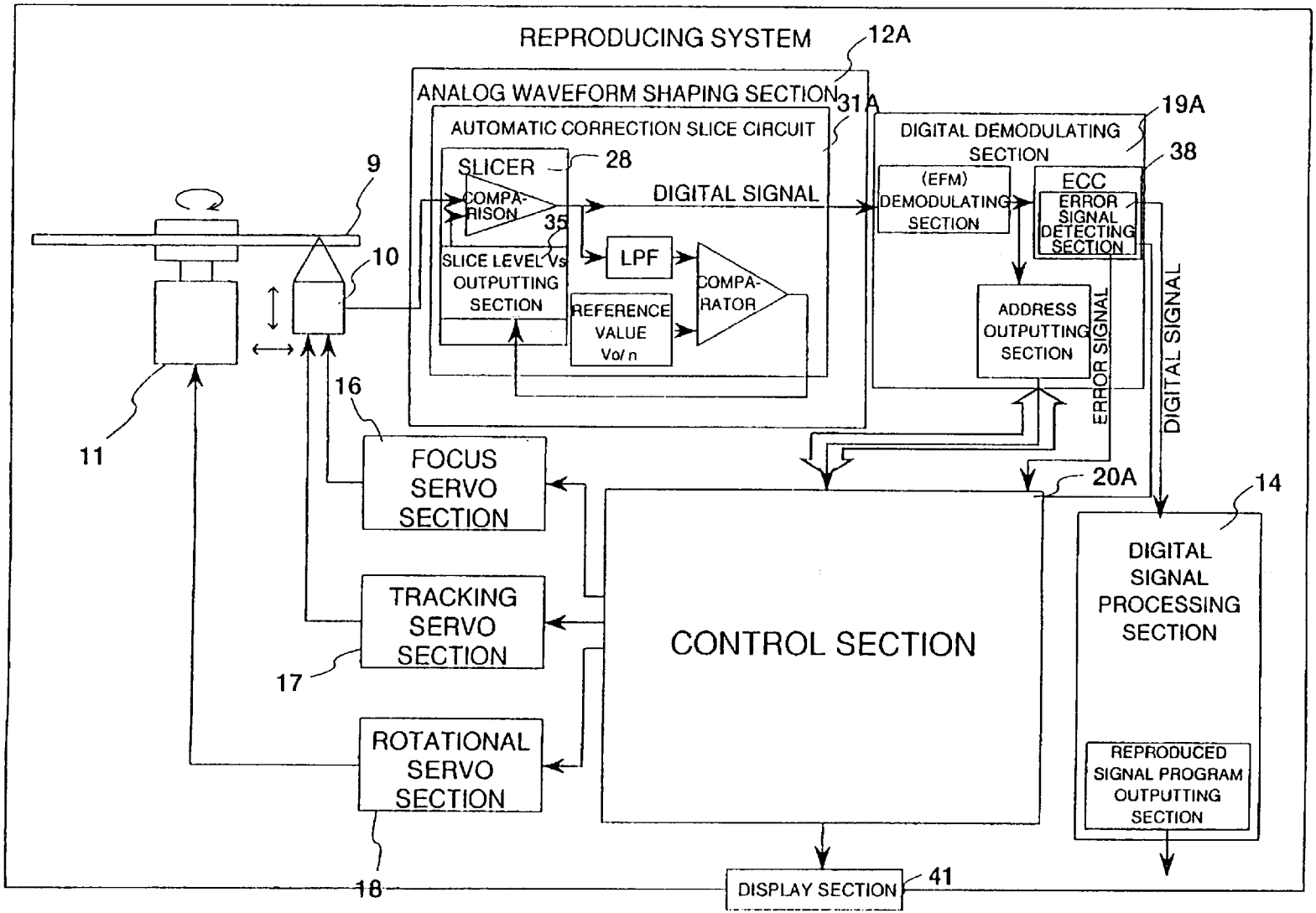
FIG. 7 is a block diagram showing an arrangement of a conventional optical disk reproducing system.

FIG. 5 illustrates one example of a recording system for original records which can change the recording equalizing quantity and the recording power during the recording. In FIG. 5, the whole of the recording system for original records is designated at numeral 61, and numeral 1 represents a recording laser, numeral 2 designates an optical modulator, numeral 3 denotes a mirror, numeral 4 indicates a lens actuator, numeral 5 stands for a glass plate onto which a photoresist is applied, numeral 6 represents spindle motor, numeral 7 designates a signal source, numeral 21 denotes a recording equalizer, and numeral 22 depicts a control section. A leaser beam optical systems for the focus control and the recording and so on are omitted in the illustration.

Figure 19A:
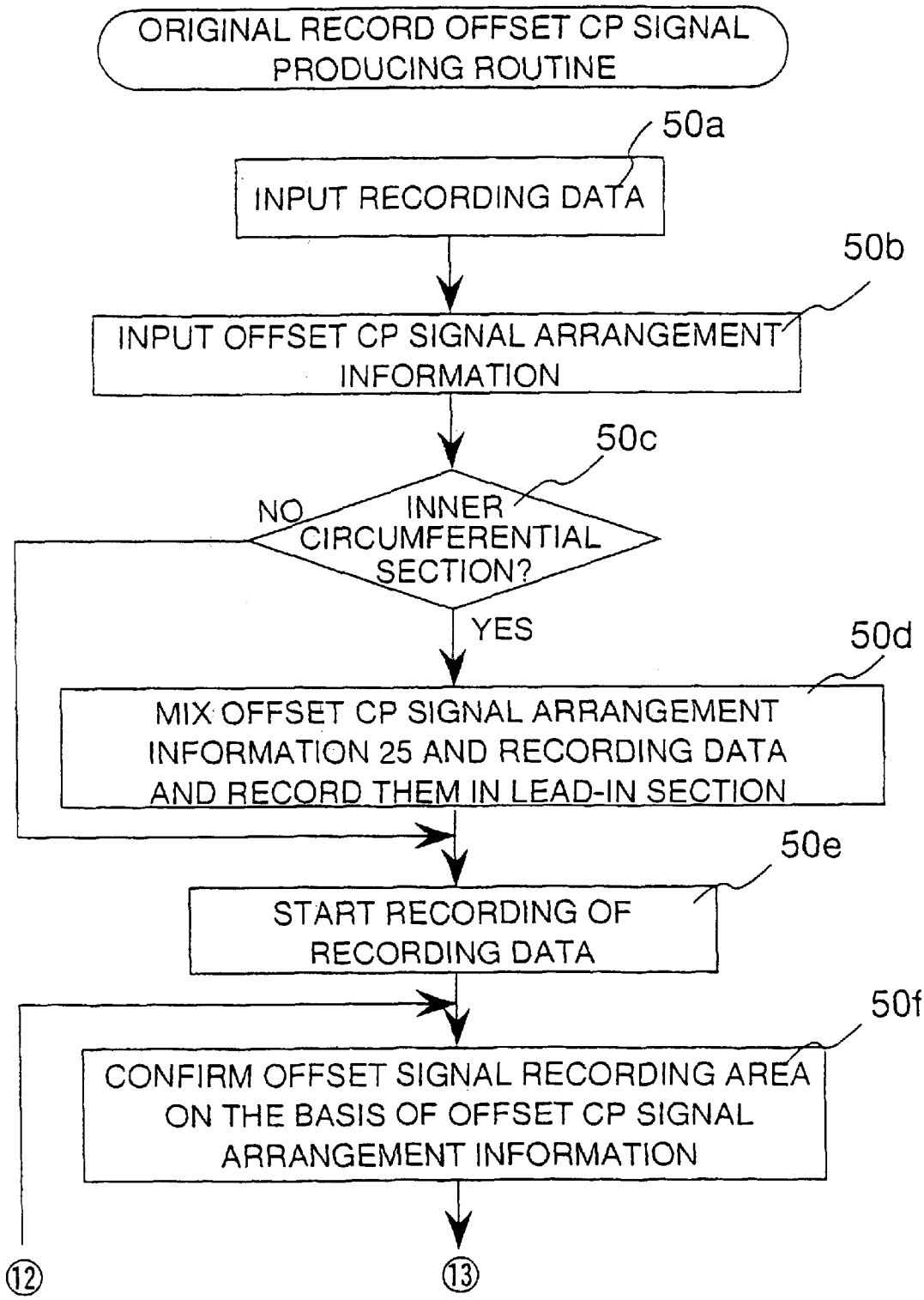
FIGS. 19A and 19B illustrate the first and second halves of a flow chart for recording an offset CP signal in an original record in the first embodiment.
Figure 19B:
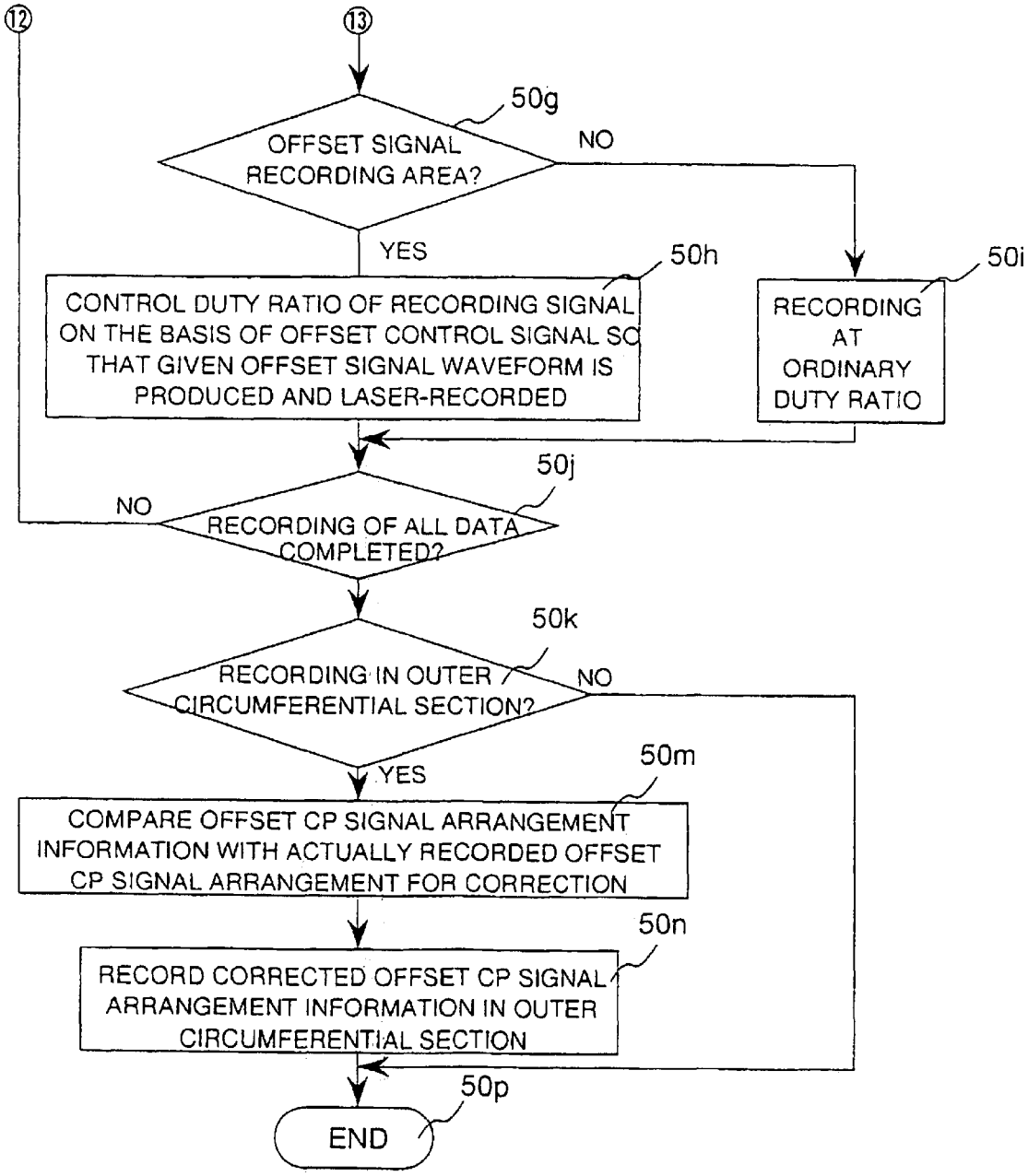

A fabricating method of an original record will be described hereinbelow with reference to the block diagram of FIG. 5 and a flow chart of FIGS. 19A and 19B. First of all, a step 50a is implemented to input data of a program generally containing a copy protection program such as computer software beforehand, and further a step 50b is executed to input the CP signal arrangement information 25 which in turn, is divided into a control signal and data in the CP signal arrangement information processing section 90, this data being checked with the input data in a mixing section 90a On the other hand, the control signal is supplied to a control section 22, and a duty ratio control signal is generated at a given position. The operator of the original record fabricating apparatus in advance decides whether or not the CP signal arrangement information 25 is recorded in the inner circumferential section (lead-in area) of a disk, and inputs it through a keyboard or the like. A step 50c follows to check, from this input information, whether or not to make a record in the inner circumferential section. If the answer is "YES", a step 50d follows to record the mixture of the offset CP signal arrangement information 25 and the recording data in the lead-in section.

Furthermore, a step 50e is implemented to start the recording of the recording data, then followed by a step 50f to check, from the offset CP signal arrangement information 25, whether or not it is an offset signal recording area. If the answer is "NO", in a step 50i the recording is made at the ordinary duty ratio. On the other hand, if the decision is "YES", in a step 50h a CP signal generating section 22a changes the duty ratio of the signal to the recording laser on the basis of the offset CP signal arrangement information 50. Thus, the output and duty ratio of the laser light is controlled so that the offset voltage varies to a given waveform. If a step 50j does not decide that all the data come to an end, the operational flow returns to the step 50f. On the other hand, if finished, a step 50k is executed to check whether or not to record the aforementioned offset CP signal arrangement information 25 in the outer circumferential section. If the decision is "NO", control goes to a step 50p to terminate this operation. On the other hand, if the decision is "YES", control advances to a step 50m to compare the offset CP signal arrangement information previously programmed with the offset CP signal actually recorded in the mastering apparatus in quantity, period and deviation on arrangement, thus making correction in accordance with the comparison results. In a step 50n, an offset CP signal arrangement information recording area is produced in the outer circumferential section 5b of an original record, and the corrected data is recorded therein. In the mastering apparatus 61, the cutting is advanced from the inner circumferential section to the outer circumferential section, and hence the offset creating result is treated as data after the all the data are recorded. In the system where the recording is made in the outer circumferential section, the offset CP signal arrangement information 25 corrected with this data is recorded, thereby sharply improving the manufacturing yield of the original record.

In a case where the recording equalizing quantity is changed after the offset CP signal arrangement signal having a specific pattern is generated from the signal generating section, the control section 22 gives an instruction to a pulse width control section 21a of the recording equalizer to change the recording equalizing quantity, i.e., the duty ratio. In a case where the duty ratio is changed with the variation of the recording power, the control section 22 gives an instruction to the recording laser 1 to change the recording power. The recording laser 1 includes a laser element and power regulating element, for example, a noise eater or AO modulator, and changes its own power. The recording equalizer 21 is designed to switch the equalizing quantity in accordance with instructions from the external.

The area recording a signal in which the center of the eye pattern is shifted from the center of the amplitude according to the above-mentioned method can readily be formed without greatly revising the conventional recording system for original records. Except for recording to an original record, the optical disk according to this invention can be fabricated with the same processes as the conventional optical disk, whereby it is mass-producible at a low cost.

A system for reproducing an optical disk according to this invention where a copy preventing program and copy preventing signal can stop the reproduction of a duplicated disk and the operation of a software, with the result that the duplication prevention of the optical disk is substantially possible. Although FIG. 8 shows an example that the offset CP signal arrangement information 25 is recorded in an optical ROM area, it is also possible that, as shown in FIG. 10, this information is enciphered using, as a one direction function, a disclosed key type function such as an RSA function and elliptic curve function as shown in FIG. 11 and recorded in an optical ROM or magnetic recording section provided in the face or rear surface of an optical disk.

Figure 10:
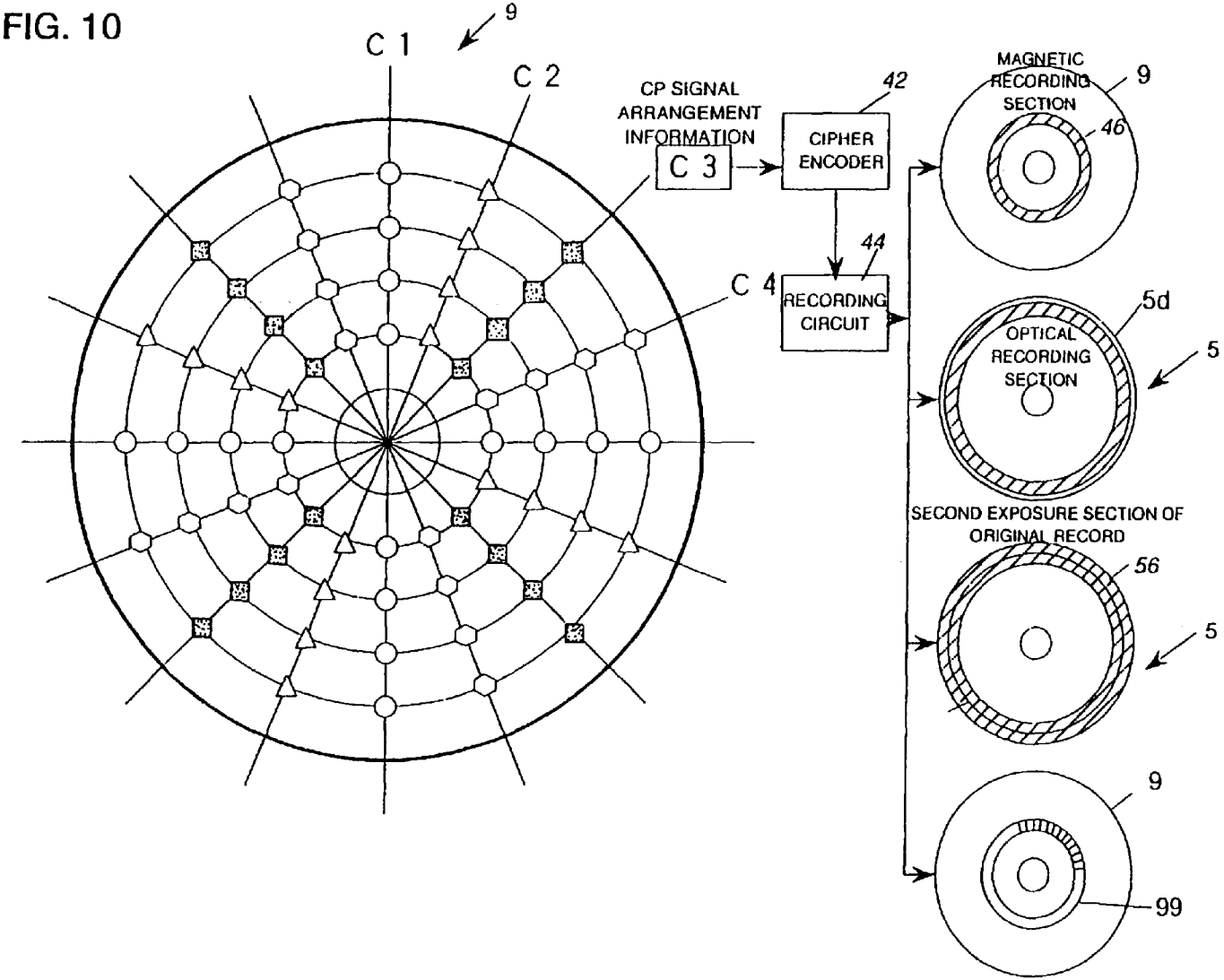
FIG. 10 is an illustration for explanation of four recording ways for CP signal arrangement information in the first embodiment.
Figure 11:
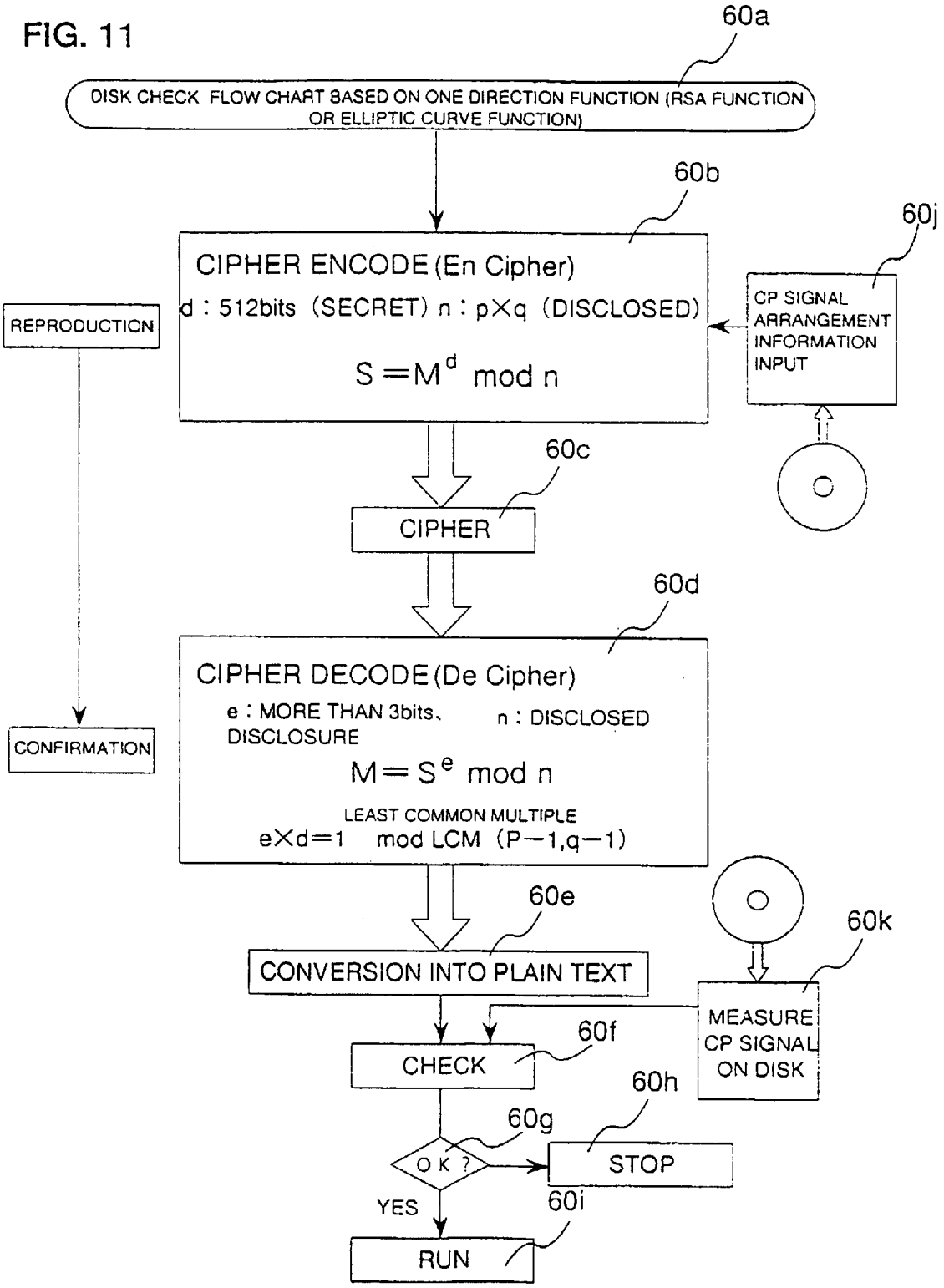
FIG. 11 is a disk check flowchart using a cipher in the first embodiment.
Figure 14A:
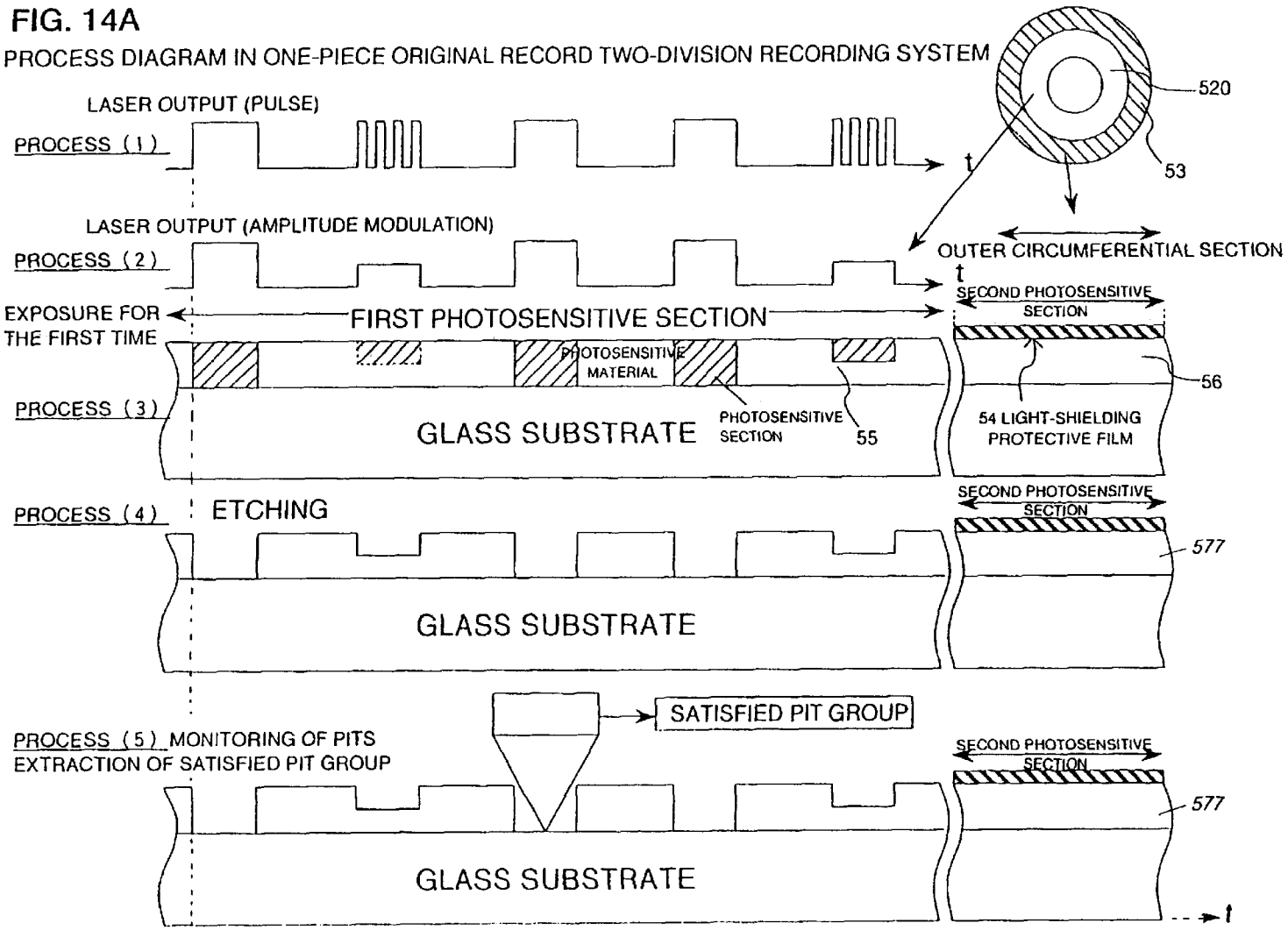
FIGS. 14A and 14B illustrate the first half and latter half of a process by a one-piece original record two-division recording system in the first embodiment.
Figure 14B:
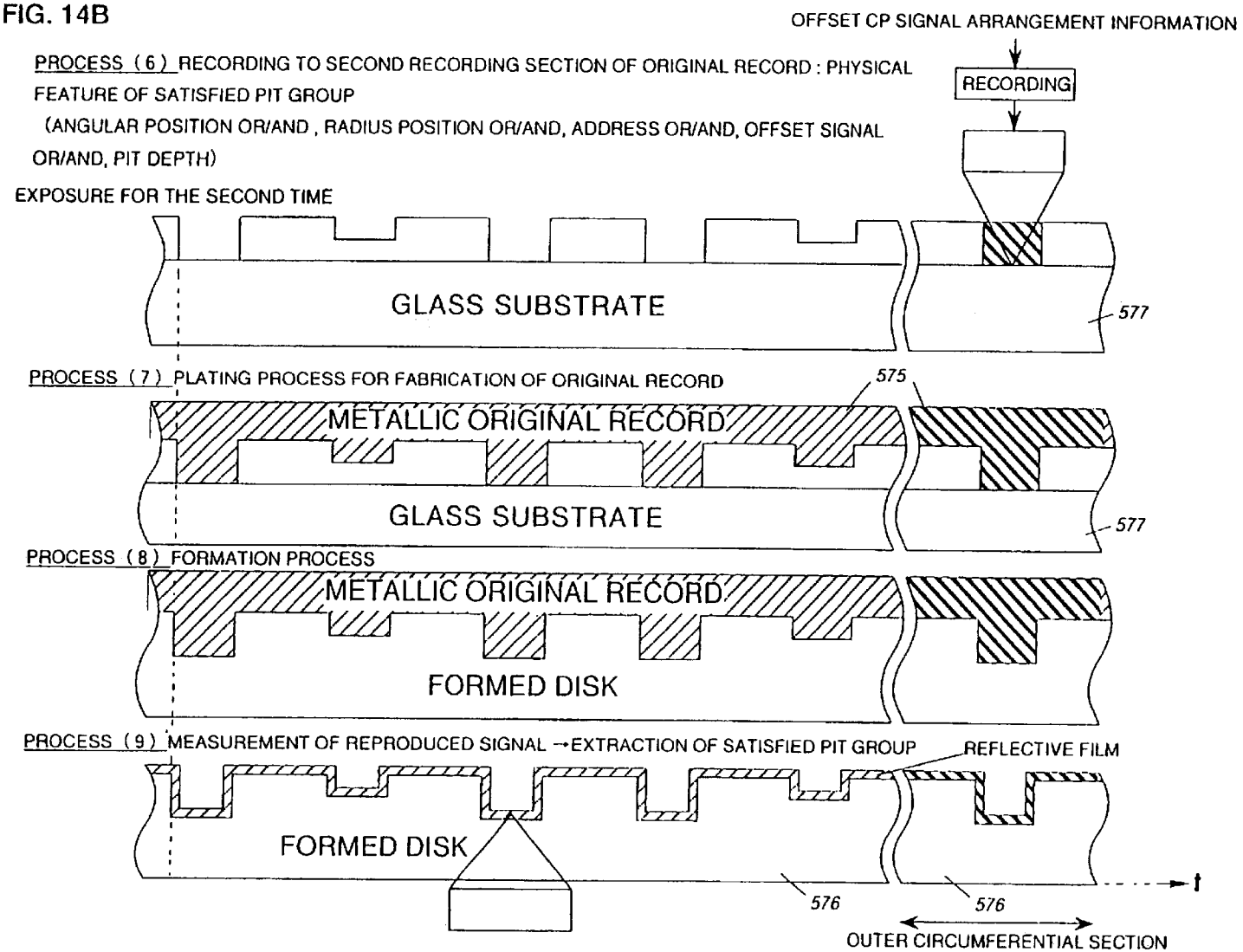
Figures 16A, 16B:
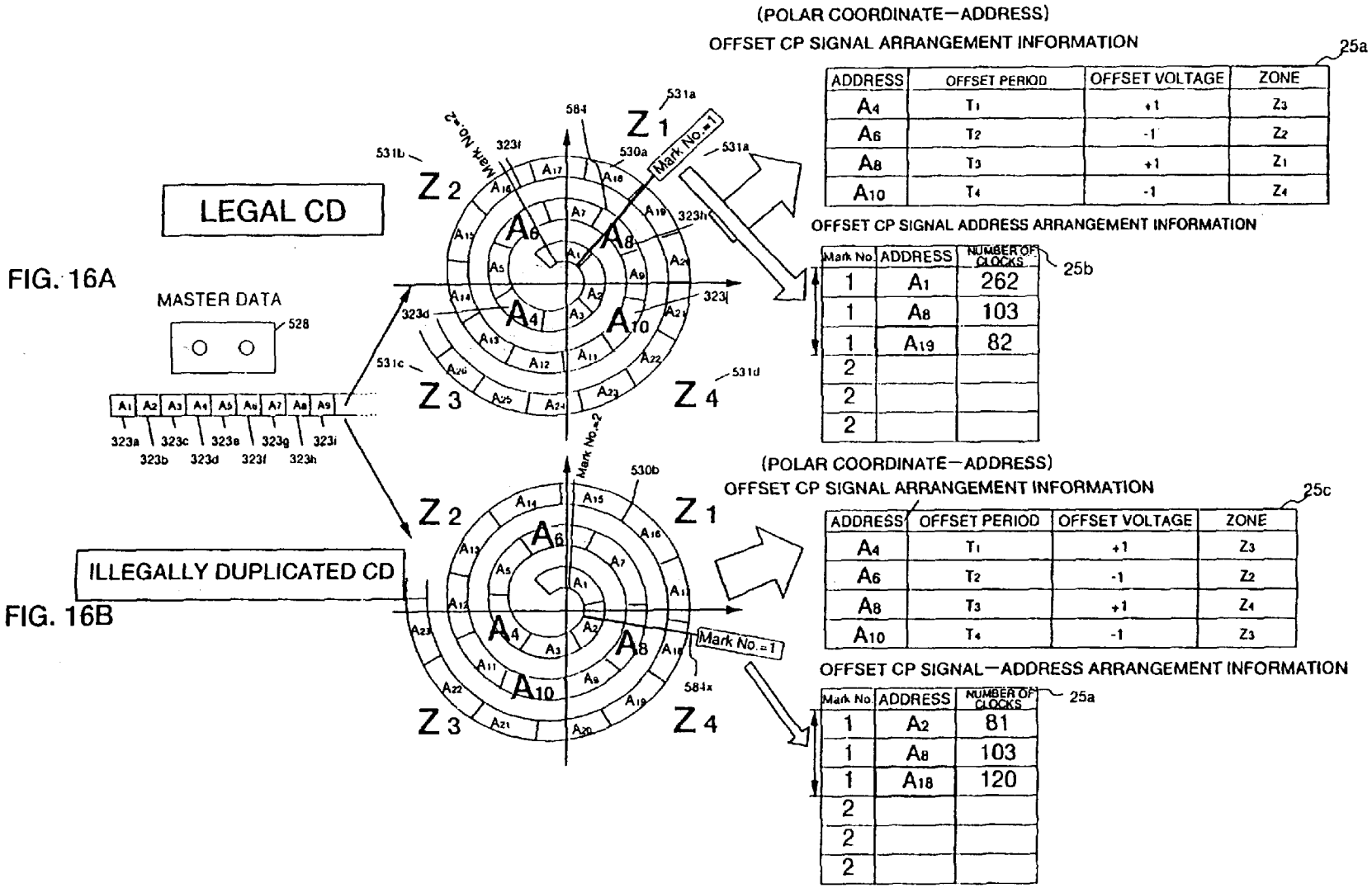
FIG. 16A shows the principle of duplication prevention in the first embodiment.
FIG. 16B illustrates the principle of duplication prevention in the first embodiment.
Figure 17:
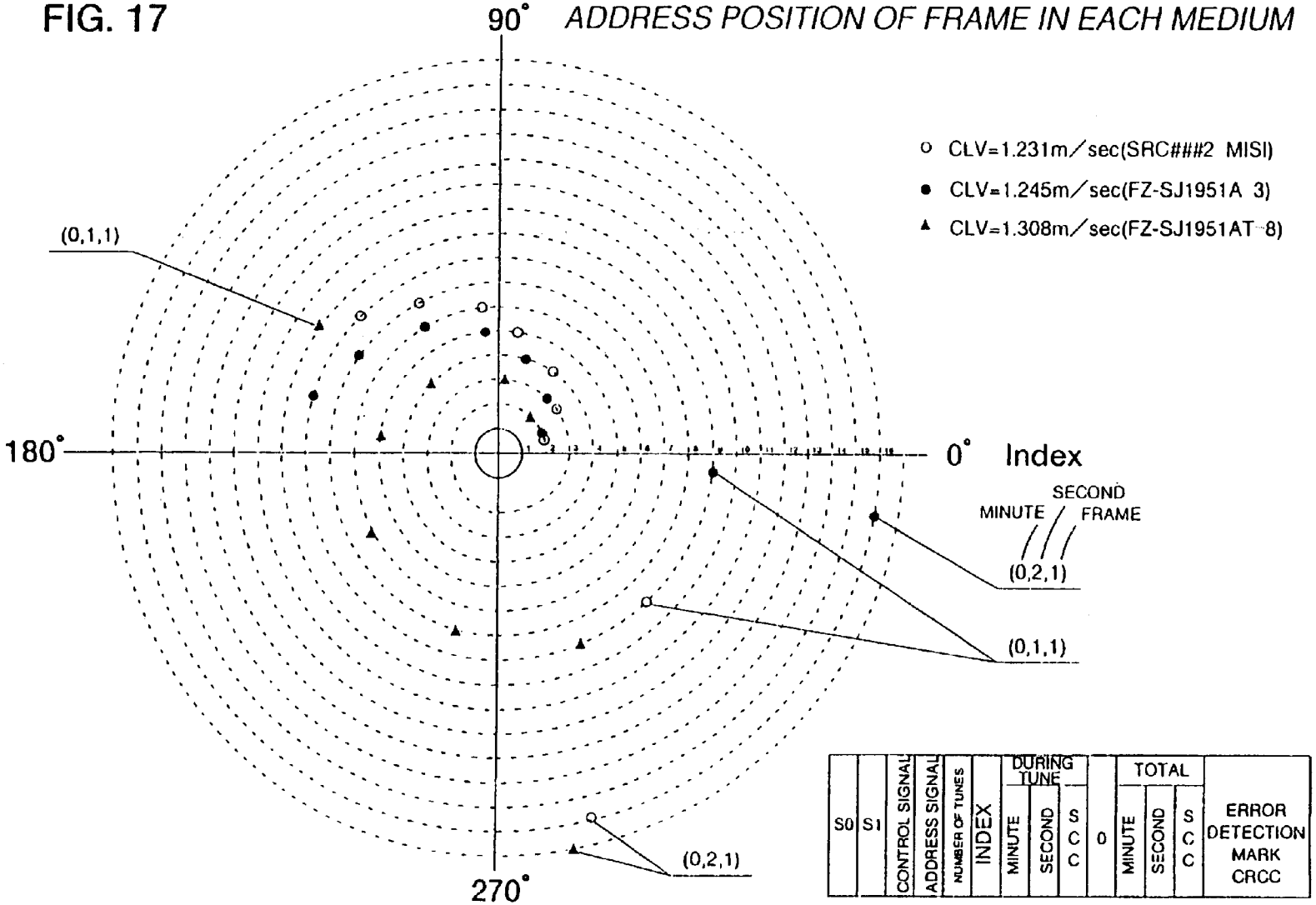
FIG. 17 illustrates a coordinate arrangement of addresses measured in each CD original record in the first embodiment.

FIG. 10 is a diagrammatic illustration for describing that the offset signal type CP signal shown in FIG. 8A or address-angular arrangement information type CP signal described in FIGS. 16A, 16B and 17 are measured from an optical disk 9 to produce the CP signal arrangement information 25. In the optical disk 9 shown in the left-hand side of FIG. 10, CP signals indicated by circles and triangles are arranged on tracks. Further, in the optical disk 9 there is also recorded the CP signal arrangement information 25. The CP signal arrangement information 25 read out is enciphered by a one direction function cipher encoder 42 indicated in a step 60b in FIG. 11 and recorded by a recording circuit 44 in a magnetic recording section 46 of an optical disk or in the outer circumferential section of the original record 5. It is also possible to record it in a second exposure section 53 of the original record 5 described with reference to FIG. 14 or record it in a bar code-printed section 99 provided in the inner circumferential section of the optical disk 9.

The CP signal arrangement informative 25 thus recorded in the optical ROM section, magnetic recording section or the like is difficult to revise without the cipher key. That is, since the CP signal arrangement information 25 is enciphered with the one direction function, the function of the cipher encoder can not be deciphered by the function of the cipher decoder. For example, in the FIG. 11 case, the duplication traders know only the cipher decoder, for which reason the number of times of the calculation is needed to be $2^{512}$ times and the calculation requires several million years.

This will further be described with reference to a flow chart of FIG. 11. FIG. 11 illustrates a duplicated disk operation program based on the check of the cipher using the one direction function. The CP signal arrangement information 25 is produced in a step 60j and is enciphered with the RSA function using a 512 bit secrete key in a step 60b, before the cipher is recorded in an optical disk in a step 60c. Subsequently, the information of this optical disk is reproduced in a step 60d and the cipher is decrypted (converted) into a plain text in a step 60e. Although the duplication traders can know the function of the cipher data in the step 60d, since as indicated in the steps 60b and 60d the function such as the RSA function used in the disclosed key communication system is reversed in use between the encoder and the decoder, for deciphering the encoder function, much time is required because of the calculations of $2^{512}$ times, thus making it substantially impossible to revise the CP signal arrangement information 255. In a step 60f, the CP signal 24 of the optical disk measured in a step 60k is checked with the decrypted CP signal arrangement information 25. If the check result shows no coincidence (when the answer of a step 60g is "NO"), the operational flow goes to a step 60h to stop the operation of the program. On the other hand, if the result indicates coincidence (when the answer of the step 60g is "YES"), a step 60i is executed to carry out the operation of the program. In the FIG. 11 example, the CP signal 24 is not required to be the offset signal as described before. Accordingly, it is impossible to actually revise the CP signal arrangement information 25. In the FIG. 11 example, the CP signal 24 is not required to be the offset signal as described before. On the other hand, the foregoing offset CP signal can be realized as shown in FIG. 12 by the change of the duty ratio of the pulse duration in the recording equalizer or the change of the laser light power, and the relationship between the laser output and the size of the pit hole is kept to be non-linear. Accordingly, in a case where an offset voltage arranged original record is fabricated faithfully according to the program, the lowering of the yield can take place. However, in the FIG. 11 example, as understood from the arrangement of the original record fabricating apparatus (mastering apparatus) 61 shown in FIGS. 13A and 13B, the CP signal arrangement information 25 and a logic ID obtained from a logic ID number generator 546 are mixed in a mixer and enciphered in a one direction function cipher encoder (enciphering device) 42 before being recorded in a magnetic recording section 46 of the optical disk through a magnetic recording circuit 44 and magnetic head 45. As described above, it is impossible to revise the CP signal arrangement information 25. This cipher information is reproduced through a magnetic head 45a and magnetic reproducing section 48 of a recording and reproducing system 47 and decrypted through a cipher decoder 43 to obtain the decoded CP signal arrangement information 25. In this case, it is also possible that the CP signal arrangement information 25 is recorded in an optical recording section and reproduced through an optical head 10. The CP signal arrangement information 25 measured on the basis of the address or angular information by an address detecting section 51 and offset voltage VsO detecting section 340 of an offset voltage signal position detecting section 52 of an optical reproducing section 50 is delivered to a legal disk check section 33. The original record fabrication apparatus (mastering apparatus) 61 shown in FIGS. 13A and 13B corresponds to the apparatus shown in FIG. 5, and the reproducing system also corresponds to the system shown in FIG. 1.

Figure 15:
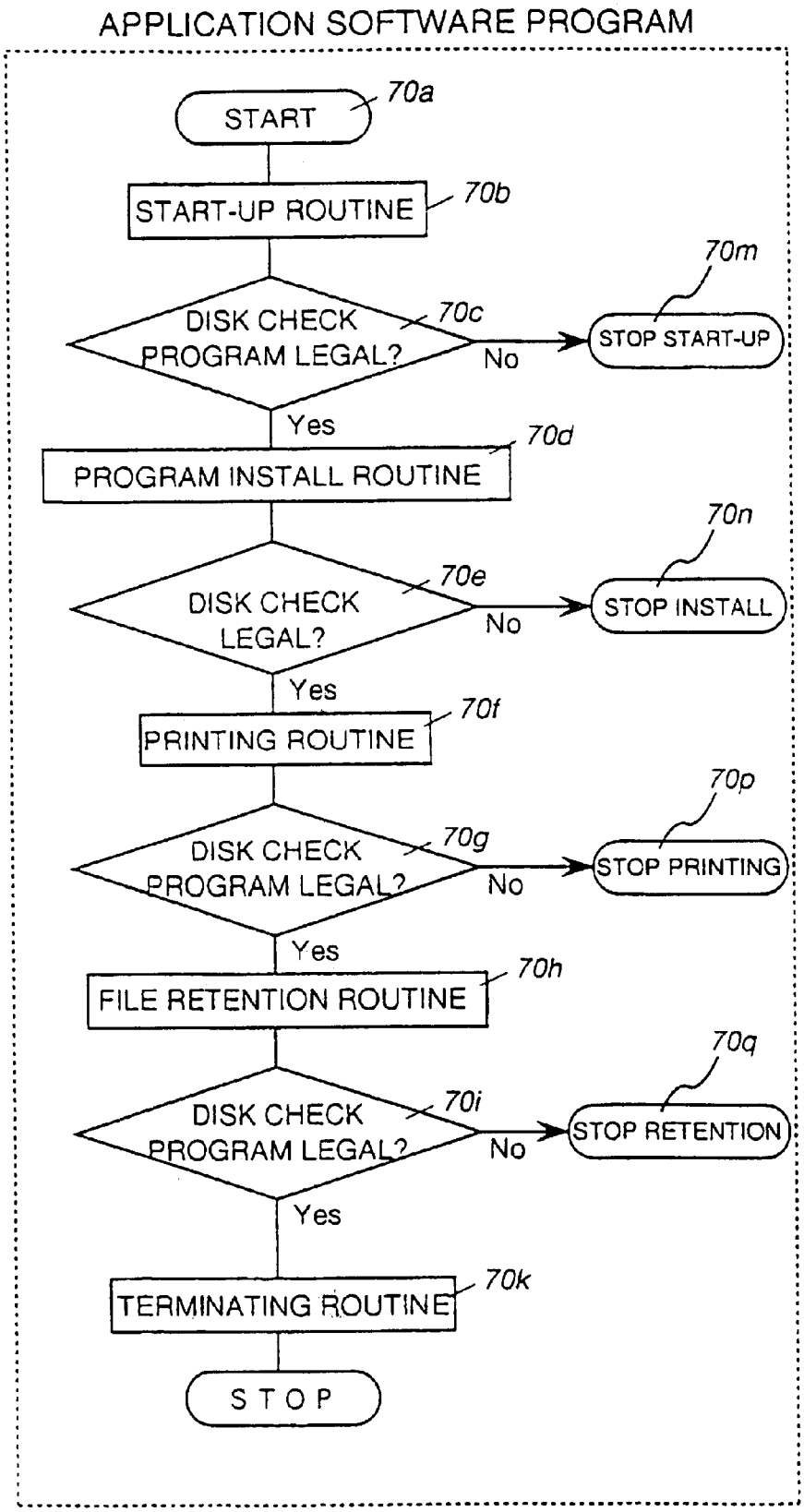
FIG. 15 is a flow chart showing an application software containing a copy preventing program in the first embodiment.

The legal disk check section 33 detects a duplicated disk in accordance with the flow chart of the duplicated disk operation preventing program 49 described with reference to FIGS. 9A and 9B, and stops the operation of the program or stops the output of the reproduced signal. In this case, as shown in FIG. 15, disk check steps 70c, 70e, 70g and 70i are added to start-up step, program install step 70d, printing step 70f and file retention step 70h of an application software program. Thus, even if the pirate edition traders analyze the software to remove the duplication preventing steps 70c, 70e and so on, the duplication is impossible except that, for example, 1000 steps are removed.

Figure 13A:
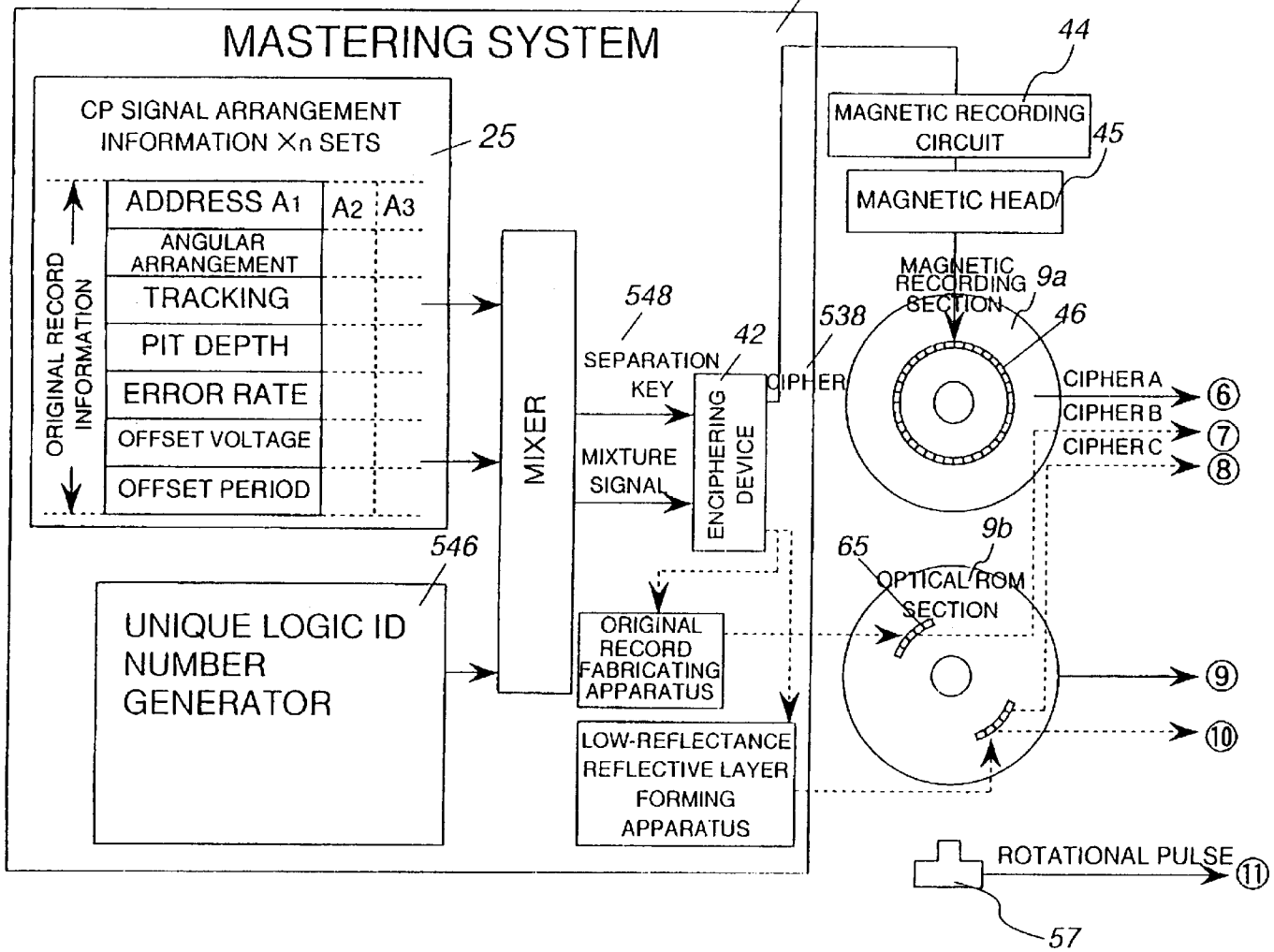
FIGS. 13A and 13B are partial block diagrams showing an original record fabricating apparatus (mastering apparatus) and a reproducing system (recording and reproducing system) in the first embodiment.
Figure 13B:
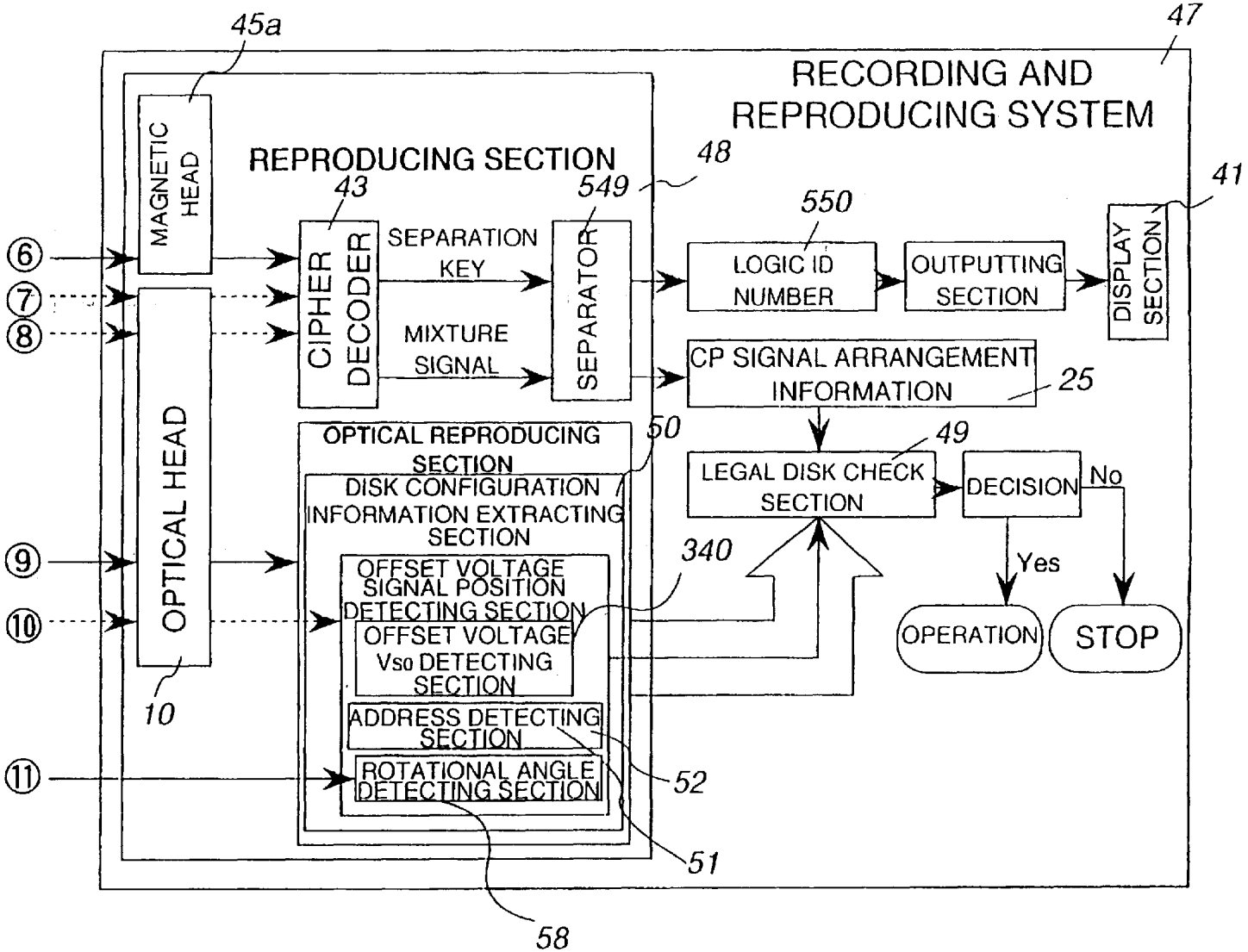

With reference to FIGS. 13A and 13B, disclosed is a method in which the CP signal arrangement information 25 such as the offset voltage of the original record is enciphered with the one direction function and recorded in the magnetic recording section 46 after the original record is manufactured. It is also possible that as an optical disk 9b shown in FIGS. 13A and 13B the program and the CP signal 24 are recorded in a first exposure portion 520 of the original record, while the CP signal arrangement information 25 is recorded in a second exposure portion 53 of the original record at its outer circumferential section. This method will be described in detail with reference to FIGS. 14A and 14B. In processes 1 and 2, a laser light signal is given to the first exposure section 520 in the inner circumferential section of the original record, and in a process 3, the second exposure section 53, i.e., the outer circumferential section, of the original record is covered with a light-shielding protective film 54 before a photoresist layer of a first photosensitive section 55 is subjected to light. At this time, in a process 4, a pit pattern is formed through etching, and in a process, the offset signal is actually measured to obtain the offset CP signal arrangement information 25 which in turn, is enciphered. Subsequently, in a process 6, the light-shielding protective film 54 is removed from the second photosensitive section 56 and the enciphered signal is recorded therein through the laser light exposure for the second time. In processes 7, 8 and 9, the original record is plated to become a metallic original record, and a disk substrate is made by formation using this original record, before a reflective film is formed thereon, thus fabricating CDs.

With the exposure for the second time, an offset control signal is given at random and recorded to and in the first exposure section 520 of the original record, and the arrangement of the satisfied offset CP signal is enciphered and recorded in the second exposure section 53 in the outer or inner circumferential section of the original record. Accordingly, it is possible to record the copy preventing signal, whose manufacturing yield is extremely low, without taking the yield into consideration. That is, when a signal whose yield is 1/1000 is duplicated, it is required to fabricate the original record 1000 times, which makes it economically difficult to try the duplication.

Figure 18:
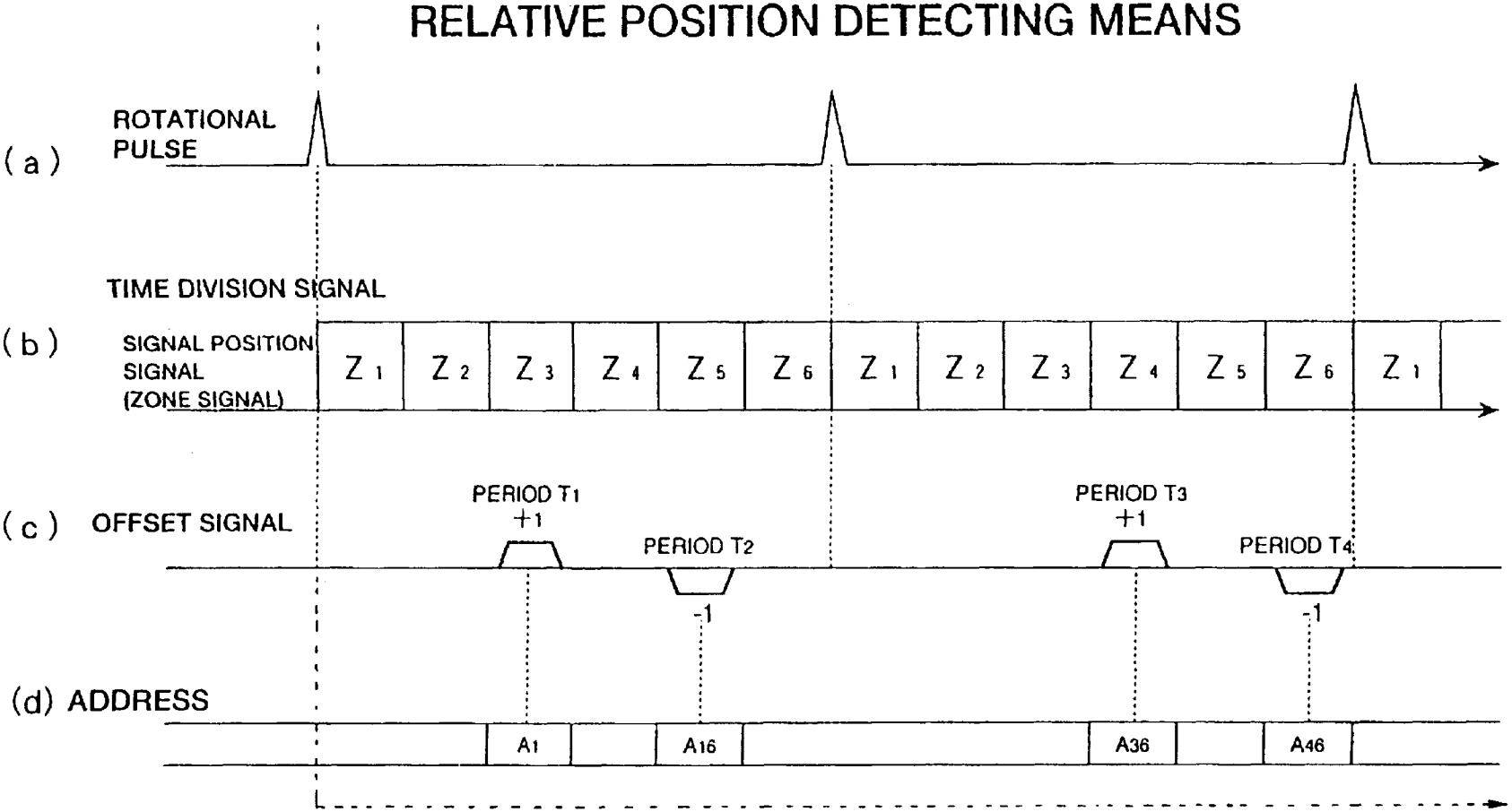
FIG. 18 shows waveforms, FIG. 18(a) showing a waveform in a re-arrangement detecting method of an offset signal by time division in the first embodiment, FIG. 18(b) illustrating a waveform in a rearrangement information method of an offset signal by time division in the first embodiment, FIG. 18(c) showing a waveform in a rearrangement information method of an offset signal by time division in the first embodiment, and FIG. 18(d) illustrating a waveform in a rearrangement information method of an offset signal by time division in the first embodiment.

Furthermore, in FIGS. 13A and 13B a rotation angle detecting section 58 can measure the rotational angle, at which the offset CP signal is arranged, on the basis of the rotational pulses from a motor 57 or an FG (rotational sensor), not shown, to produce an offset CP signal arrangement information 25a as shown in FIG. 16. As shown by (a), (b) and (c) in FIG. 18, the angular position is more accurately detectable by time division of the rotational pluses. It is also appropriate that, as shown by (c) and (d) in FIG. 18, the arrangement of the address, offset signal and period is detected. In this case, since it is a legal disk, the measured offset CP signal arrangement information 25a is correct. That is, the + offset voltage signal having a period T1 is recorded in the address A1 and in the angular position Z3. Further, the copy preventing program does not stop the program read out. However, in the illegally duplicated CD disk shown in FIG. 16B, the offset CP signal arrangement information 25 is different from the normal data. This is because the CD is CLV-recorded. FIG. 17 shows experimental data which make clear that each original record actually has a different CD address arrangement. Even if the address is the same, each original record has a slightly different linear velocity and track pitch, and hence errors are accumulated so that a large difference occurs.

Returning back to FIGS. 16A and 16B, in the case of the legal CD, the angular arrangement of the offset CP signal takes Z3, Z2, Z1 and Z4, and on the other hand, in the FIG. 16B case, the arrangement takes Z3, Z2, Z4 and Z3, a large difference therebetween occurs. The currently available mastering apparatus can not accurately control the angular position. This pattern is not duplicable and the offset CP signal arrangement information 25a can not be revised because of the one direction function cipher. Accordingly, the duplication traders can not duplicate the CD using the current apparatus. In addition, it is also appropriate that the offset CP signal arrangement information 25 is recorded as a bar-code like low-reflective portion group on the optical disk.

Second Embodiment

Figure 20:
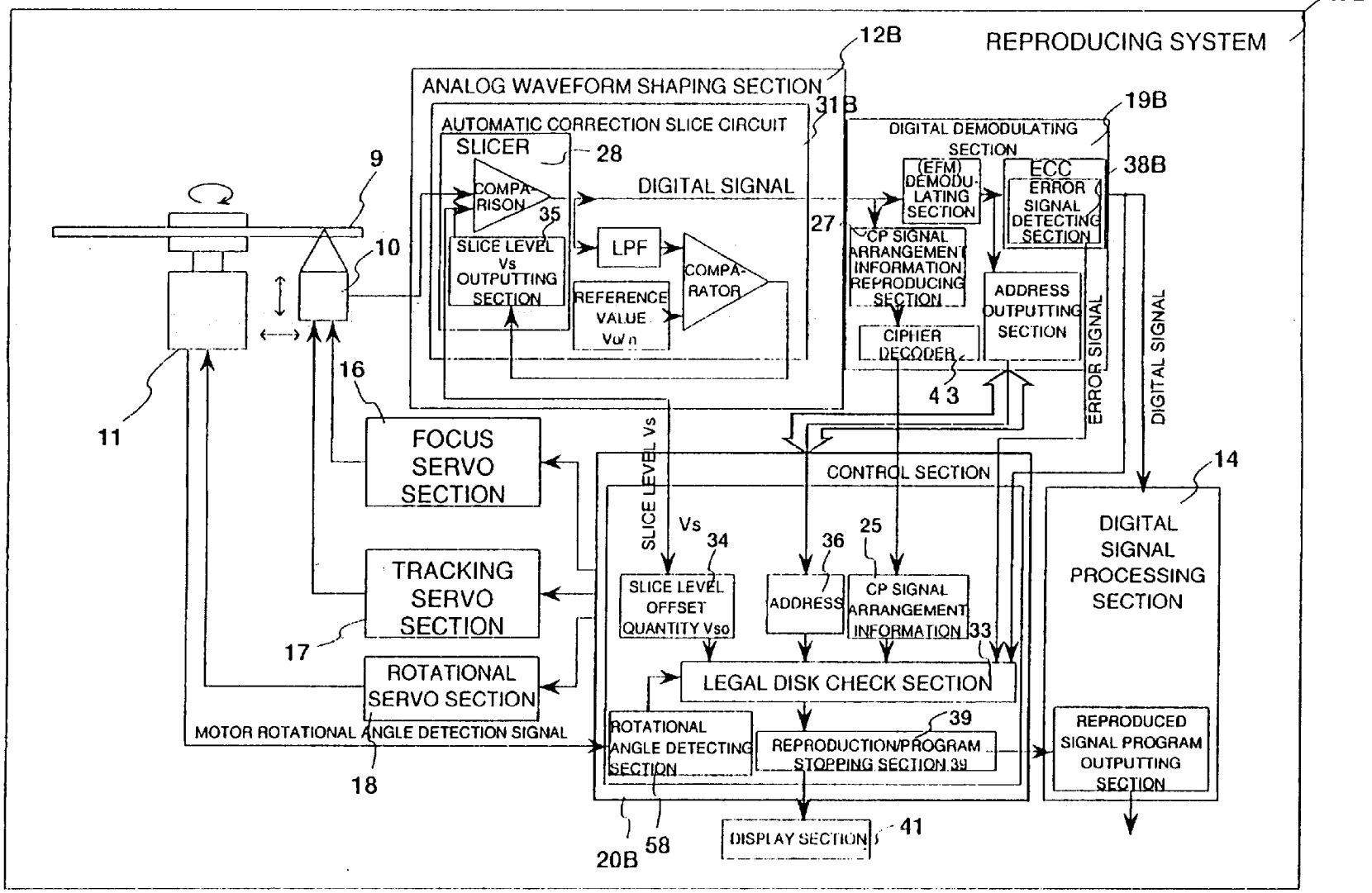
FIG. 20 is a block diagram showing an arrangement of an optical disk reproducing system according to a second embodiment of the present invention.
Figure 21A:
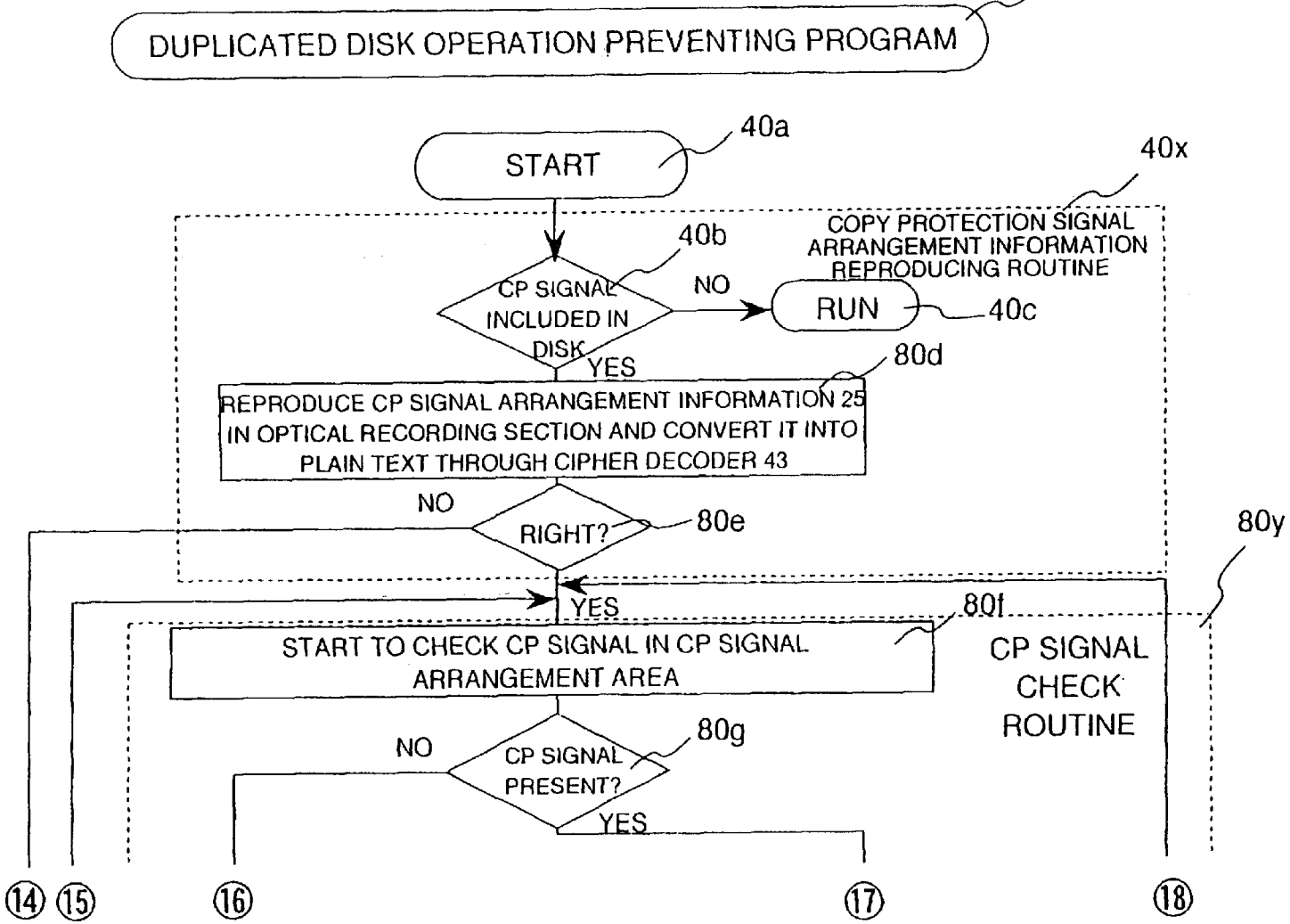
FIGS. 21A and 21B show the first and second halves of a flow chart of a duplicated disk operation preventing program in the second embodiment.
Figure 21B:
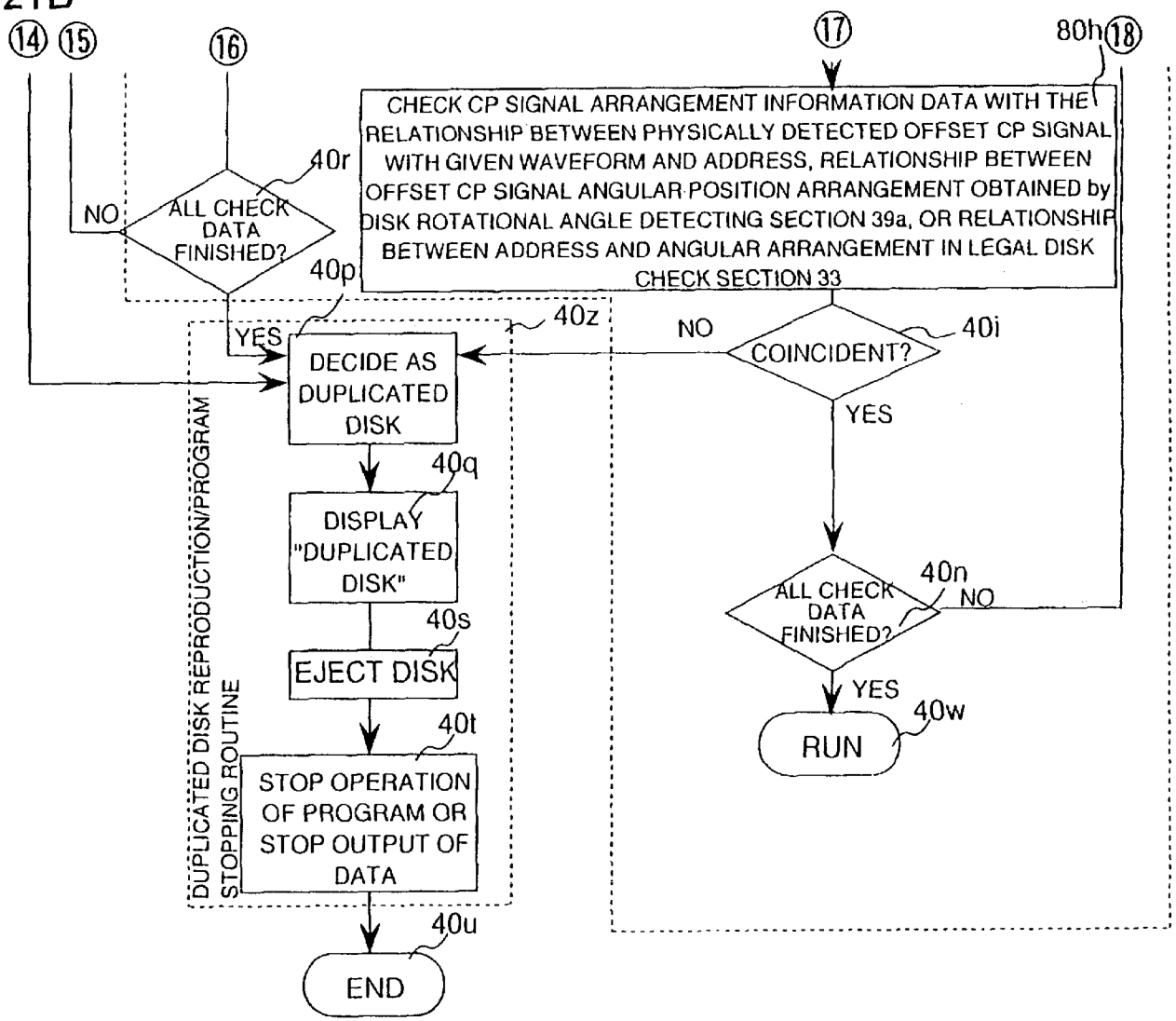

Secondly, a description will be made with reference to FIGS. 20, 21A and 21B in terms of an optical recording medium and optical disk reproducing system according to a second embodiment of this invention. Although the preceding signals 26a to 26h, together with the CP signal arrangement information 25, are recorded in the FIG. 8 optical recording medium 9, in this second embodiment these preceding signals are unnecessary to record (even if recorded, the reproducing can not detect them).

The difference between a reproducing system 47B shown in FIG. 20 and the reproducing system shown in FIG. 1 is as follows. That is, the adder 31a, being in the feedback path of the automatic correction slice circuit 31 in FIG. 1, is removed and therefore the offset quantity correction signal generating section 29 is also removed. Accordingly, in FIG. 20, the automatic correction slice circuit is designated at 31B, the analog waveform shaping section is denoted at 12B, and the control section is depicted at 20B. In addition, in FIG. 20, a rotational angle detecting section 58, which detects the rotational angle of the motor 11 is provided within the control section 20B. Further, a cipher decoder 43 is provided and the digital demodulating section is designated at 19B. FIGS. 21A and 21B are flow charts showing a processing procedure taken when the control section 20B is constructed with a CPU. With reference to these flow charts, a description will be made in terms of a duplication checking method based on the CP signal including the CP signal arrangement information 25 and the address angular arrangement information.

The CP signal arrangement information 25 is in advance enciphered by an cipher encode using a one direction function such as the RSA function. A description will be made about only steps of the FIGS. 21A and 21B flow charts different from the FIGS. 9A and 9B. In a step 80d the enciphered CP signal arrangement information 25 is decrypted into a plain text through the cipher decoder 43 of the digital demodulating section 19A, then followed by a step 80e to check whether the plain text is correct or not. Since the one direction function such as the RSA function is employed and the correct cipher can not be produced except that the key of the cipher encoder is leaked, the first check of the revision of the cipher is possible at this stage. If the answer of the first check is "YES", the operational flow goes to a step 80f to start to check the duplication of the disk, and in a step 80g, the disk is measure to check whether the CP signal such as the offset signal exists or not. If the CP signal is present, the operational flow advances to a step 80h. In the case of checking only the angular arrangement of the addresses, the step 80g is omitted and the operational flow goes to a step 80h.

In the step 80h the CP signal is checked. As this check, there are two methods: one being that the offset signal is used as the CP signal and the other being that a physical angular arrangement information of the addresses on the disk is used as the CP signal. In the case of using the offset signal as the CP signal, the address position in which the offset signal is disposed or the angular position on the disk is measured and is coincidence-checked with the normal address position data of the corresponding CP signal indicated by the CP signal arrangement information 25 or the normal angular position data on the disk. On the other hand, in the case of using the address angular arrangement information on the disk as the CP signal, the angular position of the arrangement of a specific address on the disk is measured sp as to check whether or not it is coincident with the normal angular arrangement information indicated by the CP signal arrangement information 25.

If the check result of the step 40e shows no coincidence, a decision is made such that it is a duplicated disk, thus stopping the operation of the program or stopping the reproduction. If the check result is correct, the operation starts. It is also possible that the checking work in FIGS. 21A and 21B is accomplished by a CD drive, or by OS of a personal computer connected to the CD drive or the list of an application program. In the FIGS. 21A and 21B system, since the cipher encoder using the one direction function is used, the CP signal arrangement information 25 can not be revised. Accordingly, the duplication traders can not revise the CP signal arrangement information 25 so that the check result shows the coincidence with the CP signal, thus preventing the duplication.

Effect of the Invention

In the optical disk and the reproducing system therefor according to this invention, an area for recording a signal that the center of the eye pattern is shifted from the center of the amplitude is provided after a signal with a constant pattern, and the reproducing system additionally has the function whereby, after the constant pattern signal is detected, the offset voltage is intentionally applied to the threshold taken in demodulating the RF signal into the digital signal to reproduce the signal that the center of the eye pattern is shifted from the center of the amplitude, and if the offset signal is not reproduced, to stop the reproduction.

In addition, in the reproducing system, the signal reproduced from the area, in which the signal that the center of the eye pattern is shifted from the center of the amplitude is recorded, and demodulated into the digital signal is an ordinary signal, and when the demodulated signal is recorded in a recordable optical disk medium, the center of the eye pattern substantially comes to the center of the amplitude at reproduction. Accordingly, if the offset is added to the slice level to be taken when the reproducing system demodulates the RF signal into the digital signal and reproduced, the reproduced signal is not the ordinary signal, thus resulting in stopping the reproduction. This means that the duplicated disk is not reproducible and the illegal duplication can be prevented.

What is claimed is:

1. An optical recording medium having a first recording area where an offset signal is recorded, and a second recording area where a signal indicative of the fact that said first recording area is provided and/or the position whereat said first recording area is recorded, said offset signal being produced by shifting a center of an eve pattern corresponding to an optimal slice level of a recorded signal in an analog signal processing section in a reproducing apparatus which reproduces the recorded signal, from a center of an amplitude of said eye pattern.

2. An optical recording medium having a first recording area where an offset signal in which a duty ration of a signal recording section in a recording track is shifted from a standard value is recorded and a second recording area where a signal indicative of the fact that said first recording area is provided and/or the position whereat said first recording area is recorded.

3. An optical recording medium as set forth in claim 1, wherein a signal indicative of the fact that said first recording area is close to its end is further recorded in said first recording area.

4. An optical recording medium as set forth in claim 1, wherein said second recording area is formed in one of a position preceding said first recording area in reproduction and a lead-in section of said medium.

5. A method of fabricating an optical disk original record for forming and manufacturing an optical disk having a first recording area where an offset signal in which a duty ration of a signal recording section in a recording track is shifted from a standard value is recorded and a second recording area where a signal indicative of the fact that said first recording area is provided and/or the position whereat said first recording area is recorded, comprising the steps of applying a photoresist on a base material for said optical disk original record, making said photoresist exposed to light intensity-modulated in accordance with an information signal to be recorded, and developing said photoresist to form an irregular pit confutation corresponding to its sensitivity on said base material for said optical disk original record, wherein for the formation of said irregular pit configuration a recording equalizing quantity for said information signal is changed so that a duty ration of a length of each of pits to a distance between said pits is changed to form a signal area where a center of an eye pattern is shifted from a center of an amplitude in a specific relationship.

6. A method of fabricating an optical disk original record for forming and manufacturing an optical disk having a first recording area where an offset signal in which a duty ration of a signal recording section in a recording track is shifted from a standard value is recorded and a second recording area where a signal indicative of the fact that said first recording area is provided and/or the position whereat said first recording area is recorded, comprising the steps of applying a photoresist on a base material for said optical disk original record, making said photoresist exposed to light intensity-modulated in accordance with an information signal to be recorded, and developing said photoresist to form an irregular pit configuration corresponding to its sensitivity on said base material for said optical disk original record, wherein for the formation of said irregular pit configuration the intensity of said light to which said photoresist is exposed is changed to form a signal area where a center of an eye pattern is shifted from a center of an amplitude in accordance with the change of the light intensity.

7. A method of fabricating an optical disk original record for forming and manufacturing an optical disk having a first recording area where an offset signal in which a duty ration of a signal recording section in a recording track is shifted from a standard value is recorded and a second recording area where a signal indicative of the fact that said first recording are is provided and/or the position whereat said first recording area is recorded, comprising the steps of applying a photoresist on a base material for said optical disk original record, making said photoresist exposed to light intensity-modulated in accordance with an information signal to be recorded, and developing said photoresist to form an irregular pit configuration corresponding to its sensitivity on aid base material for said optical disk original record, wherein for the formation of said irregular pit configuration a recording equalizing quantity for said information signal is increased and the intensity of said light to which said photoresist is exposed is lowered, or said recording equalizing quantity for said information signal is decreased and the intensity of said light to which said photoresist is exposed is increased, thereby forming a signal are in which a center of an eye pattern is shifted from a center of an amplitude.

8. A method of reproducing an optical disk comprising a step of, after a signal having a specific pattern is detected, changing a threshold value to be used in demodulating an RF signal into a digital signal.

9. A reproducing system for an optical disk comprising means for, after a signal having a specific pattern is detected, changing a threshold value to be used in demodulating an RF signal into a digital signal.

10. A reproducing system for an optical disk is set forth in claim 9, further comprising means for, when a signal is not reproduced from an area in which a signal having a center of an eye pattern shifted from a center of an amplitude is recorded, stopping a further reproduction.

11. An optical disk reproducing system which reads out, through an optical head, a data signal including a program modulated and recorded on an optical disk to reproduce an analog signal, and slices through slice circuit, said analog signal with a slice voltage corrected with an offset voltage being applied to a reference slice voltage in accordance with a duty ratio of said analog signal to reproduce a first digital signal, and demodulates said first digital signal into a second digital signal through a demodulator to reproduce a third digital signal from said second digital signal through an error correction circuit, said reproducing system comprising an offset signal variation detecting section for detecting that said offset voltage varies in a specific state, and means for, when said offset signal variation detecting section does not detect that said offset signal is in said specific state, stopping one of an output of said data and an operation of said program.

12. An optical disk reproducing system as set forth in claim 11, further comprising means for reproducing offset signal arrangement information recorded in an area of said optical disk, and further for, only when said offset signal variation detecting section detects that an offset signal is recorded in a specific area of said optical disk in a specific state indicated in said offset signal arrangement information, continuing one of an output of data on said optical disk and an operation of said program, and, when not detecting it, stopping one of the output of said data on said optical disk and the operation of said program.

13. An optical disk reproducing system as set forth in claim 12, wherein said optical head reproduces said offset signal arrangement information recorded in an optical recording section.

14. An optical disk reproducing system as set forth in claim 12, wherein a magnetic head reproduces said offset signal arrangement information recorded in a magnetic recording section.

15. An illegal program operation stopping method using a reproducing system which reads out, through an optical head, a data signal including a program modulated and recorded on an optical disk to reproduce an analog signal, and slices through a slice circuit, said analog signal with a slice voltage corrected with an offset voltage being applied to a reference slice voltage in accordance with a duty ratio of said analog signal to reproduce a first digital signal, and demodulates said first digital signal into a second digital signal through a demodulator to produce a third digital signal from said second digital signal through an error correction circuit, wherein an offset signal variation detecting section is provided in said reproducing system to detect that said offset voltage varies in a specific state, and when said offset signal variation detecting section does not detect that said offset signal is in said specific state, one of an output of said data and an operation of said program is stopped.

16. An illegal program operation stopping method as set forth in claim 15, wherein offset signal arrangement information recorded in an area of said optical disk is reproduced, and only when said offset signal variation detecting section detects that an offset signal is recorded in a specific area of said optical disk in a specific state indicated in said offset signal arrangement information, one of an output of data on said optical disk and an operation of said program is continued, and when not detecting it, one of the output of said data on said optical disk and the operation of said program is stopped.

17. An illegal program operation stopping method as claimed in claim 16, wherein said offset signal arrangement information recorded in an optical recording section is reproduced by said optical head.

18. An illegal program operation stopping method as claimed in claim 16, wherein said offset signal arrangement information recorded in a magnetic recording section is reproduced by a magnetic head.

19. A reproducing system comprising:

means for reproducing a disk physical feature from an optical disk in which disk physical feature information indicative of an optically detectable feature extracted from said optical disk is enciphered with one direction function and recorded in a cipher recording section;

means for converting the reproduced signal into a plain text through a cipher decoder;

measuring means for obtaining said disk physical feature information and further for measuring a disk physical feature of said optical disk;

check means for obtaining the measure disk physical feature information from said measuring means to check the measured disk physical feature information with said physical feature information; and means for carrying out one of reproduction of said optical disk and operation of a program recorded in said optical disk only when the check result of said check means satisfies a constant condition.

20. A reproducing system as set forth in claim 19, wherein one of a RSA function, elliptic curve function and disclosed key cipher function is used as said one direction function.

21. A reproducing system as set forth in claim 19, further comprising:

address detecting means for, when said measuring means reproducts the information from said optical disc, detecting an address to use, as said optically detectable feature information, an arrangement coordinate including an arrangement angle in a specific address of data on said optical disk; and rotational angle detecting means for detecting at least said arrangement angle of said specific address on said optical disk.

*22. An optical disk of the type having: a recording layer in which pits are arranged at predetermined positions in the track direction in accordance with a modulation signal thereby data are recorded, an edge of each of selected ones of said pits being shifted from each of said predetermined positions in the track direction in accordance with arrangement information.*

*23. The optical disk as set forth in claim 22 wherein a signal obtained by encrypting said arrangement information is also recorded.*

*24. The optical disk as set forth in claim 22 wherein said recording layer is divided into first and second areas such that said edge of each of selected one of said pits is shifted in accordance with said arrangement information in said first area and said edge of each of said pits is not shifted for each of said predetermined positions in said second area.*

*25. A reproducing system for an optical disk of the type having a recording layer in which pits are arranged at predetermined positions in the track direction in accordance with a modulation signal thereby data are recorded, and specific pits among said pits are shifted from said predetermined positions in the track direction comprising:*

*a check section for checking whether or not an edge of each of selected ones of said pits corresonding to a reproduced signal and an edge of each of selected ones of said pits corresonding to arrangement information determining track direction arrangement state of each of said pits have a specific relationship in the track direction arrangement by processing said reproduced signal using said arrangement information; and*

*a reproduction/program stopping section responsive to said check section for carrying out data reproduction and/or operations according to a reproduced program when a result of checking by said check section indicates said specific relationship, and for stopping data reproduction and/or operations according to said reproduced program when said result of checking by said check station does not indicate said specific relationship.*

*26. The reproducing system as set forth in claim 25, wherein said check section is arranged to determine whether or not said optical disk is either legally manufactured or legally copied or not so that a reproduced signal is outputted only when it is determined that said optical disk is legally manufactured or legally copied.*

*27. The reproducing system as set forth in claim 25, wherein said check section is arranged to check said pits of a specific address.*

*28. The reproducing system as set forth in claim 25, further comprising a cipher decoder for decrypting said arrangement information which is encrypted. thereby said check section is arranged to perform checking with respect to reproduced signal using said arrangement information decrypted by said cipher decoder.*

*29. The reproducing system as set forth in claim 25, wherein said information including said arrangement information is picked up by an optical head from said optical disk.*

* * * * *